United States Patent
Yip et al.

(10) Patent No.: US 11,412,200 B2
(45) Date of Patent: Aug. 9, 2022

(54) METHOD OF PROCESSING AND TRANSMITTING THREE-DIMENSIONAL CONTENT

(71) Applicant: Samsung Electronics Co., Ltd., Suwon-si (KR)

(72) Inventors: Eric Yip, Suwon-si (KR); Jaehyeon Bae, Suwon-si (KR); Hyunkoo Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/958,438

(22) PCT Filed: Jan. 8, 2020

(86) PCT No.: PCT/KR2020/000350
§ 371 (c)(1),
(2) Date: Jun. 26, 2020

(87) PCT Pub. No.: WO2020/145668
PCT Pub. Date: Jul. 16, 2020

(65) Prior Publication Data
US 2021/0235058 A1    Jul. 29, 2021

Related U.S. Application Data

(60) Provisional application No. 62/821,612, filed on Mar. 21, 2019, provisional application No. 62/789,759, filed on Jan. 8, 2019.

(51) Int. Cl.
*H04N 13/194* (2018.01)
*H04N 13/178* (2018.01)
(Continued)

(52) U.S. Cl.
CPC ......... *H04N 13/194* (2018.05); *H04N 13/178* (2018.05); *H04N 21/845* (2013.01); *H04N 21/85406* (2013.01); *H04N 21/816* (2013.01)

(58) Field of Classification Search
CPC .. H04N 13/194; H04N 13/178; H04N 21/845; H04N 21/85406; H04N 21/816
See application file for complete search history.

(56) References Cited

U.S. PATENT DOCUMENTS

| 8,965,043 B2 | 2/2015 | Porter et al. |
| 9,325,964 B2 | 4/2016 | Bruls |

(Continued)

FOREIGN PATENT DOCUMENTS

| CN | 1681330 A | 10/2005 |
| CN | 102196280 A | 9/2011 |

(Continued)

OTHER PUBLICATIONS

Eric Yip et al., "6DOF Access of V-PCC Data", International Organisation for Standardisation Organisation Internationale De Normalisation, ISO/IEC JTC1/SC29/WG11, Coding of Moving Pictures and Audio, Jan. 2019, Marrakesh, Morocco.

(Continued)

*Primary Examiner* — Boubacar Abdou Tchoussou
(74) *Attorney, Agent, or Firm* — Jefferson IP Law, LLP

(57) ABSTRACT

A method of transmitting three-dimensional (3D) video content, according to an embodiment of the present disclosure, includes: defining a 3D space; obtaining placement information about at least one 3D object to be placed in the 3D space; dividing the at least one 3D object; compressing 3D video content including the divided at least one 3D object into a two-dimensional (2D) video frame; obtaining, from the 2D video frame, location information about compressed data corresponding to the divided at least one 3D (Continued)

object; encoding the 2D video frame; generating a media file including the encoded 2D video frame and the location information; and transmitting the media file.

15 Claims, 18 Drawing Sheets

(51) Int. Cl.
*H04N 21/845* (2011.01)
*H04N 21/854* (2011.01)
*H04N 21/81* (2011.01)

(56) References Cited

U.S. PATENT DOCUMENTS

| | | | |
|---|---|---|---|
| 10,587,883 B2* | 3/2020 | Wang | H04L 65/608 |
| 10,587,904 B2* | 3/2020 | Wang | H04N 21/84 |
| 10,699,444 B2* | 6/2020 | Mammou | G06T 7/70 |
| 10,771,763 B2* | 9/2020 | Zavesky | G06K 9/00671 |
| 10,783,698 B2* | 9/2020 | Mishaev | G06T 7/30 |
| 10,789,733 B2* | 9/2020 | Mammou | H04N 19/172 |
| 10,891,784 B2* | 1/2021 | Dore | G06T 17/00 |
| 10,909,725 B2* | 2/2021 | Mammou | G06T 9/001 |
| 2002/0024517 A1 | 2/2002 | Yamaguchi | H04N 13/194 345/424 |
| 2007/0253618 A1 | 11/2007 | Kim et al. | |
| 2010/0238264 A1* | 9/2010 | Liu | G06T 7/55 348/14.13 |
| 2013/0101017 A1* | 4/2013 | De Vleeschauwer | A63F 13/12 375/240.02 |
| 2014/0204088 A1 | 7/2014 | Kirk et al. | |
| 2017/0188015 A1 | 6/2017 | Heidemann et al. | |
| 2018/0190024 A1* | 7/2018 | Dugan | G06T 19/006 |
| 2018/0268570 A1 | 9/2018 | Budagavi et al. | |
| 2019/0014361 A1* | 1/2019 | Wang | H04N 21/23605 |
| 2019/0020880 A1* | 1/2019 | Wang | H04N 21/23614 |
| 2019/0087979 A1* | 3/2019 | Mammou | H04N 19/597 |
| 2019/0156518 A1* | 5/2019 | Mammou | G06T 7/0002 |
| 2019/0156519 A1* | 5/2019 | Mammou | H04N 19/172 |
| 2019/0156520 A1* | 5/2019 | Mammou | G06T 9/001 |
| 2019/0371051 A1* | 12/2019 | Dore | G06T 17/00 |
| 2020/0043220 A1* | 2/2020 | Mishaev | G06T 1/20 |
| 2020/0120347 A1* | 4/2020 | Boyce | H04N 19/42 |
| 2020/0153885 A1* | 5/2020 | Lee | G06T 9/001 |
| 2020/0154137 A1* | 5/2020 | Fleureau | H04N 19/172 |
| 2020/0169717 A1* | 5/2020 | Zavesky | H04N 21/816 |
| 2020/0202608 A1* | 6/2020 | Mekuria | H04L 65/4084 |
| 2020/0252647 A1* | 8/2020 | Lasserre | G06T 9/00 |
| 2020/0314449 A1* | 10/2020 | Fleureau | H04N 19/597 |
| 2020/0359053 A1* | 11/2020 | Yano | H04N 19/597 |
| 2020/0374559 A1* | 11/2020 | Fleureau | H04N 19/46 |
| 2020/0389676 A1* | 12/2020 | Denoual | H04N 21/234345 |
| 2020/0404237 A1* | 12/2020 | Zavesky | G06T 19/20 |
| 2021/0012536 A1* | 1/2021 | Mammou | G06T 9/00 |
| 2021/0112236 A1* | 4/2021 | Fleureau | H04N 21/8451 |
| 2021/0112277 A1* | 4/2021 | Ricard | G06T 17/00 |
| 2021/0118188 A1* | 4/2021 | Zhang | H04N 21/4402 |
| 2021/0343069 A1* | 11/2021 | Takahashi | H04N 19/70 |
| 2022/0014827 A1* | 1/2022 | Denoual | H04N 19/70 |
| 2022/0030272 A1* | 1/2022 | Han | H04N 19/597 |

FOREIGN PATENT DOCUMENTS

| | | |
|---|---|---|
| CN | 102742283 A | 10/2012 |
| EP | 1 574 996 A2 | 9/2005 |
| EP | 2 670 146 A1 | 12/2013 |
| EP | 3 349 182 A1 | 7/2018 |
| JP | 2004-028727 A | 1/2004 |
| WO | 2018/130491 A1 | 7/2018 |
| WO | 2018/171758 A1 | 9/2018 |

OTHER PUBLICATIONS

Jill Boyce: SMPTE 2018 Annual Technical Conference & Exhibition, "MPEG-I Future Directions", Oct. 25, 2018, Retrieved from the Internet: URL:https://ieeexplore.ieee.org/abstract/document/8610029 [retrieved on Jul. 30, 2020].

European Search Report dated Oct. 8, 2020, issued in European Patent Application No. 20738649.1.

International Search Report dated Apr. 24, 2020, issued in an International Application No. PCT/KR2020/000350.

Written Opinion of the International Searching Authority dated Jan. 2015, issued in an International Application No. PCT/KR2020/000350.

BOYCE, MPEG-I Future Directions, SMPTE 2018 Annual Technical Conference & Exhibition, pp. 1-12, Oct. 25, 2018, Los Angeles, California. [Retrieved on Apr. 20, 2020], Retrieved from [https://ieeexplore.ieee.org/abstract/document /8610029] p. 8; and figure 5.

Christian Tulvan et al., Use Cases for Point Cloud Compression (PCC), International Organisation for Standardisation, ISO/IEC JTC1/SC29/WG11 Coding of Moving Pictures and Audio, MPEG2015/N16331, pp. 1-8, Jun. 30, 2016, Geneva, CH; [Retrieved on: Apr. 20, 2020], Retrieved from [https://mpeg.chiariglione.org/standards/.

Marek Domanski et al., Immersive visual media—MPEG-I: 360 video, virtual 1-15 navigation and beyond, 2017 International Conference on Systems, Signals and Image Processing (IWSSIP), pp. 1-10, May 24, 2017, Poznan, Poland. Retrieved on [Apr. 20, 2020], Retrieved from [DOI: 10.1109/IWSSIP.2017.7965623] pp. 5-7.

Chinese Office Action with English translation dated Nov. 15, 2021; Chinese Appln. No. 202080001966.0.

* cited by examiner

METHOD OF PROCESSING AND TRANSMITTING THREE-DIMENSIONAL CONTENT

TECHNICAL FIELD

The present disclosure relates to a method and apparatus for transmitting multimedia content. More particularly, the present disclosure relates to a method of processing and transmitting 6 degrees of freedom content by using content division and partial delivery technologies.

BACKGROUND ART 6 degrees of freedom (hereinafter, referred to as 6DoF) includes roll about the X-axis, pitch about the Y-axis, yaw about the Z-axis, forward/backward (surge), left/right (sway), and up/down (heave) translational motions in a three-dimensional (3D) Cartesian coordinate system. There is an increasing interest in the generation and transmission of 6DoF content capable of being consumed in a user's desired direction by generating information about players or objects in a virtual space by using a plurality of cameras in a studio or a sports stadium. Intel or the like uses 38.5K cameras to generate and provide a new type of content in a virtual space that could not previously be generated with existing cameras. However, in order to transmit the corresponding information, transmission of 3D spatial information, color information or the like is required in transmission of conventional two-dimensional (2D) images. Therefore, there is a need for media transmission of a very large capacity.

Accordingly, the Moving Picture Experts Group (MPEG) has discussed a new type of 3D media storage method, called point cloud compression (PCC), so as to transmit and store such 3D media. However, this also requires a very large amount of data for transmission via a network, and a terminal also requires a very large amount of calculation so as to reproduce the corresponding content. Therefore, the MPEG has studied a method of reducing a load by dividing 3D content and transmitting and processing not all of the 3D content but a part of the 3D content (divided content).

DESCRIPTION OF EMBODIMENTS

Technical Problem

As described above, three-dimensional (3D) content, in particular 6 degrees of freedom (6DoF) content, may provide various experiences and higher immersion to content consumers, but an amount of data to be processed increases exponentially. Therefore, not only being a burden on a system, but also a delay in processing time and transmission time may occur.

The present disclosure aims to solve the above-described problems and to reduce system load and improve system operation efficiency by dividing and processing 3D content into spatial or temporal parts.

Solution to Problem

Representative configurations of the present disclosure for achieving the above object are as follows.

In order to solve the above problems, a method of transmitting three-dimensional (3D) video content, according to an embodiment of the present disclosure, includes: defining a 3D space; obtaining placement information about at least one 3D object to be placed in the 3D space; dividing the at least one 3D object; compressing 3D video content including the divided at least one 3D object into a two-dimensional (2D) video frame; obtaining, from the 2D video frame, location information about compressed data corresponding to the divided at least one 3D object; encoding the 2D video frame; generating a media file including the encoded 2D video frame and the location information; and transmitting the media file.

According to another embodiment of the present disclosure, the generating of the media file includes: inserting, into a media data box inside the media file, bitstreams of a plurality of components corresponding to the divided at least one 3D object in the encoded 2D video frame and a bitstream including patch information about the at least one 3D object; and inserting, into a metadata box inside the media file, tracks for metadata corresponding to each of the plurality of components and a track for metadata corresponding to the patch information.

According to another embodiment of the present disclosure, the dividing includes dividing a single 3D object into a first sub-object and a second sub-object, and the generating of the media file includes: generating bitstreams for each component of the first sub-object and bitstreams for each component of the second sub-object into a single bitstream for each component; and generating tracks for each component of the first sub-object and tracks for each component of the second sub-object into a single track for each component.

According to another embodiment of the present disclosure, the dividing includes dividing a single 3D object into a first sub-object and a second sub-object, and the generating of the media file includes: generating bitstreams for each component of the first sub-object and bitstreams for each component of the second sub-object into separate bitstreams for each component; and generating tracks for each component of the first sub-object and tracks for each component of the second sub-object into separate tracks for each component.

According to another embodiment of the present disclosure, the media file is a file based on an International Organization for Standardization (ISO)-based media file format (ISOBMFF), the media data box is an mdat box, and the metadata box is a moov box.

According to another embodiment of the present disclosure, the 3D video content includes a point cloud, the 2D video frame includes a geometry image representing location information about points included in the point cloud, a texture image representing color information about the points, and an occupancy map image representing information about pixels having information about the point cloud among pixels of a 2D image included in the 2D video frame, and the metadata corresponding to the patch information includes auxiliary data including information about patches obtained from the point cloud.

In order to solve the above problem, a method of receiving 3D video content, according to an embodiment of the present disclosure, includes: processing a received packet to restore a media file; parsing the media file to extract an encoded 2D video frame and metadata; decoding the encoded 2D video frame; and reconstructing and outputting the 3D video content based on the 2D video frame and the metadata, and the parsing of the media file includes obtaining information about a 3D space, placement information about at least one 3D object placed in the 3D space, division information about the at least one 3D object, and location information about data corresponding to the divided at least one 3D object in the 2D video frame.

In order to solve the above problem, an apparatus for transmitting 3D video content, according to an embodiment of the present disclosure, includes: a processor configured to generate a 2D video frame obtained by compressing the 3D video content, and metadata required to reconstruct the 2D video frame into 3D content, encode the 2D video frame, and generate a media file including the encoded 2D video frame and the metadata; and a communicator configured to transmit the media file, wherein the metadata includes information about a 3D space, placement information about at least one 3D object to be placed in the 3D space, and division information about the at least one 3D object.

In order to solve the above problem, an apparatus for receiving 3D video content, according to an embodiment of the present disclosure, includes: a communicator configured to receive packetized data; and at least one processor configured to: process the packetized data to restore a media file; and parse the media file to extract an encoded 2D video frame and metadata, decode the encoded 2D video frame, and reconstruct and output the 3D video content based on the 2D video frame and the metadata, and the processor is further configured to obtain information about a 3D space, placement information about at least one 3D object placed in the 3D space, division information about the at least one 3D object, and location information about data corresponding to the divided at least one 3D object in the 2D video frame.

According to an embodiment of the present disclosure, there is provided a computer-readable recording medium having recorded thereon a program for executing the above-described method.

In addition, there are further provided another method and another system for implementing the present disclosure and a computer-readable recording medium having recorded thereon a computer program for executing the method.

Advantageous Effects of Disclosure

According to the present disclosure, it is possible to reduce system load and improve system operation efficiency by dividing and processing three-dimensional (3D) content into spatial or temporal parts.

BEST MODE

Figure 1:
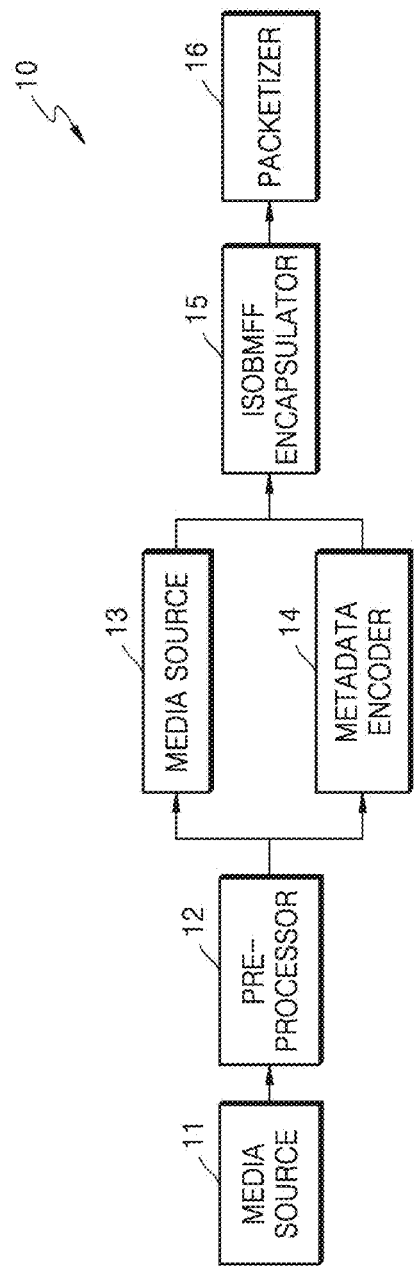
FIG. 1 illustrates an operation of an apparatus for compressing and transmitting three-dimensional (3D) video content, according to an embodiment of the present disclosure.

The representative configuration of the present disclosure for achieving the above object is as follows.

In order to solve the above problems, a method of transmitting three-dimensional (3D) video content, according to an embodiment of the present disclosure, includes: defining a 3D space; obtaining placement information about at least one 3D object to be placed in the 3D space; dividing the at least one 3D object; compressing 3D video content including the divided at least one 3D object into a two-dimensional (2D) video frame; obtaining, from the 2D video frame, location information about compressed data corresponding to the divided at least one 3D object; encoding the 2D video frame; generating a media file including the encoded 2D video frame and the location information; and transmitting the media file.

MODE OF DISCLOSURE

Hereinafter, embodiments of the present disclosure will be described in detail with reference to the accompanying drawings.

In describing the embodiments of the present disclosure, technical contents that are well known in the art to which the present disclosure belongs and are not directly associated with the present disclosure will not be described. By omitting the unnecessary description, the present disclosure is conveyed more clearly without obscuring the subject matter of the present disclosure.

For the same reason, some elements in the accompanying drawings are exaggerated, omitted, or schematically illustrated. Also, the size of each element does not reflect the actual size. In each drawing, the same reference numerals are assigned to the same or corresponding elements.

The advantages and features of the present disclosure and methods for achieving them will become more apparent from the following embodiments of the present disclosure, which are described in detail in conjunction with the accompanying drawings. However, it will be understood that the present disclosure is not limited to the following embodiments of the present disclosure, and various modifications may be made without departing from the scope of the present disclosure. The embodiments of the present disclosure set forth herein are provided so that the present disclosure will be thorough and complete, and will fully convey the concept of the present disclosure to those of ordinary skill in the art. The present disclosure should be defined by the appended claims. The same reference numerals denote the same elements throughout the specification.

It will be understood that the respective blocks of the flowcharts and the combinations of the flowcharts may be performed by computer program instructions. Since these computer program instructions may be embedded in a processor of a general-purpose computer, a special-purpose computer, or other programmable data processing apparatuses, the instructions executed through the processor of the computer or other programmable data processing apparatus generate modules for performing the functions described in the flowchart block(s). Since these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Since the computer program instructions may also be mounted on the computer or other programmable data processing apparatus, the instructions for executing the computer or other programmable data processing apparatus by generating a computer-implemented process by performing a series of operations on the computer or other programmable data processing apparatus may provide operations for executing the functions described in the flowchart block(s).

Also, each block may represent a part of a module, segment, or code that includes one or more executable instructions for executing a specified logical function(s). It should also be noted that, in some alternative implementations, the functions noted in the blocks may occur out of order. For example, two blocks illustrated in succession may in fact be executed substantially concurrently, or the blocks may sometimes be executed in the reverse order, depending on the functions involved.

The term "module" as used herein refers to a software element or a hardware element such as field programmable gate array (FPGA) or application specific integrated circuit (ASIC), and the term "module" performs certain functions. However, the term "module" is not limited to software or hardware. The term "module" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program codes, drivers, firmware, microcodes, circuits, data, databases, data structures, tables, arrays, and variables. Functions provided in the elements and the "modules" may be combined with fewer elements and "modules" or may be separated from additional elements and "modules." In addition, the elements and the "modules" may be implemented to reproduce one or more central processing units (CPUs) in the device or secure multimedia card. Also, in embodiments of the present disclosure, the "module" may include one or more processors.

Hereinafter, the present disclosure will be described in detail with reference to the accompanying drawings.

6 degrees of freedom (6DoF) content refers to content that generates and transmits additional information for representing a point in media data based on information about a position of each object in a virtual or real space and color information associated with the point.

A 6DoF camera or a content server may generate or store 6DoF content stored as 6DoF media data and metadata through various methods. A representative 6DoF content generation method is as follows.

In a point cloud compression (PCC) method of transmitting media data information by using a video, an object is projected onto a virtual plane every unit time to form an image, and temporally continuous images are stored as a video. A fetch video including color information about a point projected onto each plane and a depth video including position information about the projected point are generated, and information about the fetch video and the depth video is compressed by using a general video encoder. In addition, additional information (scene description, occupancy info., etc.) for representing the fetch video and the depth video in the virtual space is also generated.

As another method of storing 6DoF content, there is a method of transmitting position or color information about an object in a binary or American Standard for Information Interchange (ASCII) format (ply, obj, etc.). An object in a three-dimensional (3D) space includes geometry information that is geometric information about points, RGB information that is color information about the points, material information constituting a plane made by connecting the points of the object, and texture information including information about a position of the object in the 3D space between pieces of the geometry information and information about a relationship with a surrounding environment, and content is generated and stored based on the pieces of the information when storing the content.

When the 6DoF content generated in the above manner is transmitted via a network, media data constituting and representing media, such as position and color information about the points constituting the object, information about the connection between these points, and metadata representing the size of virtual space, the position information about the object, and the like has to be transmitted together.

The 6DoF content is content in which a consumer of the content is able to freely change his or her perspectives so as to see different parts of the scene, and a view of a user may be changed according to a position of the user and a direction at the position of the user in the scene. In order for a viewer to freely move a view to 6 degrees of freedom in the 6DoF content, a concept of volumetric multimedia is needed.

Point cloud technology is the most common technology for representing volume-based 6DoF content. Unlike traditional two-dimensional (2D) video in which actual data are captured in pixels by using 2D sensors, multiple points in a 3D space may be represented by point clouds.

In general, a single point of point cloud data may include depth information and texture information. The depth information is coordinates representing a 3D position of a point in a space and may be represented by (x, y, z). The texture information is information representing a color texture of a point and may be represented by (r, g, b).

Information about other attributes representing the point may be included in the point cloud data according to a capturing method and a use case.

Currently, 2D video is compressed by using video compression technology developed in MPEG (advanced video coding (AVC), high efficiency video coding (HEVC) codec, etc.), and higher compression efficiency is required because an amount of data required for representing high quality video is constantly increasing. Point cloud data also needs to be compressed so as to be used as a 6DoF content data type.

As point cloud data compression technology, video-based point cloud compression (V-PCC) is being developed by the MPEG. A 2D video codec is used to compress 3D point cloud data.

A method of encapsulating compressed point cloud data into a single file (locally or via a network) is performed by a system group of the MPEG, and specifically, may be performed by storing V-PCC in an ISOBMFF file.

In the present specification, 6DoF is used and described as an example of 3D video content having a large capacity. However, the technology described in the present disclosure is not limited to 6DoF content and may be applied to various types of 3D video content.

FIG. 1 illustrates an operation of an apparatus for compressing and transmitting 3D video content, according to an embodiment of the present disclosure.

Referring to FIG. 1, a media source 11 of a transmission apparatus 10 according to an embodiment of the present disclosure may acquire and output one or more 3D objects that are directly captured or stored in advance. The 3D object may be, for example, ply files including point cloud data. The point cloud refers to image data represented as a set of points (or voxels) each having a color value in a 3D space. The 3D object may be 3D video content including a plurality of point cloud frames.

A pre-processor 12 of the transmission apparatus 10 according to the embodiment of the present disclosure may perform pre-processing to compress a 3D object with a 2D video encoder. The pre-processor 12 may output, from the 3D object, a video frame to be used as an input of an video encoder 13 and metadata necessary for reconstructing the 3D object in a reception apparatus.

The pre-processor 12 may generate at least one 2D image by projecting 3D image data included in the 3D object onto a 2D plane. The pre-processor 12 according to the embodiment may perform projection to project an omnidirectional image in a 3D space onto a rectangular picture having a certain format. The pre-processor 12 may generate a 2D video frame from the projected 2D image.

For example, the pre-processor 12 may generate a patch by projecting a plurality of points included in a 3D point cloud onto a 2D plane. The points included in the 3D point cloud may be grouped based on at least one of a direction of a normal vector of the point, a position of the point, and a color of the point. The pre-processor 12 may generate a patch by projecting the grouped points onto a plane. The pre-processor 12 may generate a geometry image, a texture image, and an occupancy map image by classifying patches having high similarity and collecting and packing the classified patches. The geometry image may represent position information about the points included in the point cloud, and the texture image may represent color information about the points. The occupancy map image may represent information about pixels having information about the point cloud among pixels of the geometry image and the texture image.

The pre-processor 12 may a video frame including the geometry image, the texture image, and the occupancy map image, and metadata necessary for reconstructing the 3D object in the reception apparatus. For example, the pre-processor 12 may output auxiliary information as the metadata.

Next, the transmission apparatus 10 according to the embodiment of the present disclosure may compress the video frame and the metadata by using the video encoder 13 and a metadata encoder 14. The transmission apparatus 10 may include two or more video encoders 13 or may not include the metadata encoder 14, according to an implementation method.

An ISOBMFF encapsulator 15 of the transmission apparatus 10 according to the embodiment may encapsulate the video data and the metadata compressed by the video encoder 13 and the metadata encoder 14 into a media file. For example, the ISOBMFF encapsulator 15 may encapsulate the compressed video data and metadata into an ISOBMFF media file.

A packetizer 16 of the transmission apparatus 10 according to the embodiment may packetize and transmit the encapsulated media file in units of packets. For example, the packetizer 16 may transmit a bitstream including packets generated in accordance with an MPEG media transport (MMT) scheme.

The transmission apparatus 10 according to the embodiment of the present disclosure may compress video frames by using one or more video codecs so as to provide the same content to a reception apparatus having various capacities. In this case, a single ISOBMFF file may include only video data generated by using a single video codec or may include all video data generated by using a plurality of video codecs.

When a single ISOBMFF file includes all video data generated by using a plurality of video codecs, the reception apparatus may select a video codec and selectively decode the video data. As another example, a processing entity located in a network between the transmission apparatus and the reception apparatus may modify a file so as to include only video data generated by using a single video codec according to a request from the reception apparatus or pre-shared preference information and then transmit the modified file.

Figure 2:
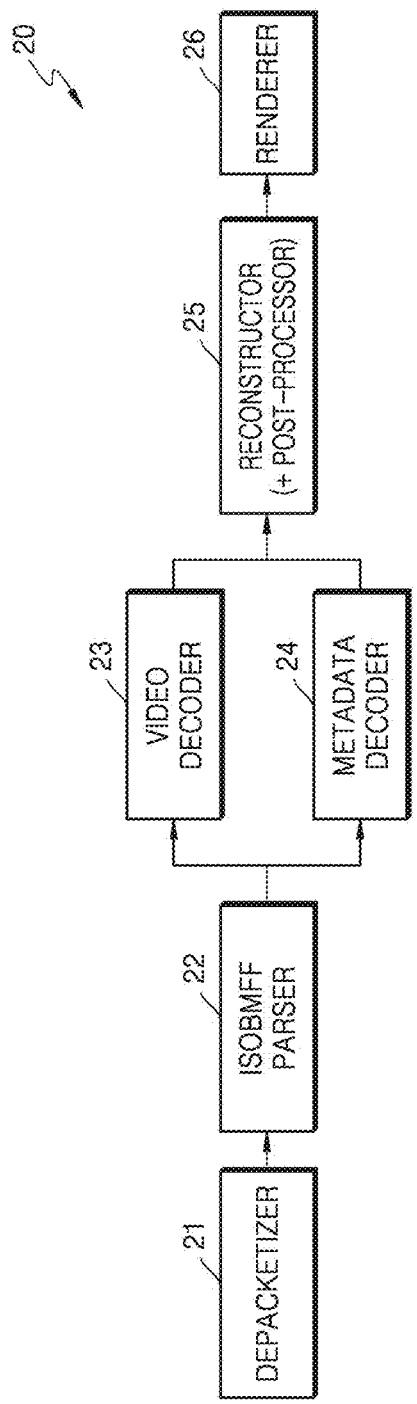
FIG. 2 illustrates an operation of a reception apparatus for receiving and outputting 3D video content, according to an embodiment of the present disclosure.

FIG. 2 illustrates an operation of a reception apparatus for receiving and outputting 3D video content, according to an embodiment of the present disclosure.

A depacketizer 21 of a reception apparatus 20 according to an embodiment may process a received packet to restore a media file. Alternatively, the depacketizer 21 may process received packets in the order of reception without waiting for all the packets constituting the media file. For example, the depacketizer 21 may process the received packets to restore an ISOBMFF file.

An ISOBMFF parser 22 of the reception apparatus 20 according to the embodiment of the present disclosure may process all or part of a received media file to extract encoded video data and metadata. The ISOBMFF parser 22 may extract the encoded video data and metadata from the received ISOBMFF file.

The reception apparatus 20 according to the embodiment of the present disclosure may decode the encoded video data and metadata by using a video decoder 23 and a metadata decoder 24.

A reconstructor 25 of the reception apparatus 20 according to the embodiment of the present disclosure may reconstruct a 3D object by using the decoded video data and metadata. The reception apparatus 20 according to the embodiment of the present disclosure may further include a post-processor for improving image quality.

For example, the video data may include a texture image, a geometry image, and an occupancy map image, and the metadata may include auxiliary information including patch information. The reconstructor 25 according to the embodiment may reconstruct geometry of points by using the geometry image, the occupancy map image, and the auxiliary information. The reconstructor 25 may reconstruct a point cloud based on the reconstructed geometry and texture image.

A renderer 26 of the reception apparatus 20 according to the embodiment of the present disclosure may display a 3D image on a screen by rendering a reconstructed 3D object.

As described above with reference to FIG. 1, in order to transmit 3D video content, the transmission apparatus 10 according to the embodiment of the present disclosure may compress the 3D video content into 2D video data and encapsulate the compressed video data according to a certain media file format. In this case, according to an embodiment of the present disclosure, the compressed point cloud may be encapsulated in the ISOBMFF file and then transmitted.

A V-PCC stream includes V-PCC components that contain a 2D video-compressed stream for a geometry, a texture, and an occupancy map. An ISOBMFF container includes the following tracks.

A timed metadata track containing V-PCC defined metadata (parameter sets and auxiliary information)

At least one restricted video scheme track containing a video-coded elementary stream for geometry data At least one restricted video scheme track containing a video-coded elementary stream for texture data At least one restricted video scheme track containing a video-coded elementary stream for occupancy map data Synchronization between the elementary steams in the component tracks are processed by the ISOBMFF track timing structures (stts, ctts, and cslg, or equivalent mechanisms in movie fragments). Like the timed metadata track, samples including a single point cloud frame across different components tracks have to have the same decoding time. The V-PCC parameter sets used for such samples have to have a decoding time equal to or prior to a decoding time of a frame.

Since the point cloud is volume-based, the size of data required to represent point clouds is large, even with compression. Therefore, the partial spatial or temporal access of such point cloud data is an important tool that may support the delivery of point cloud 6DoF content.

Volumetric point clouds may be spatially divided for spatial access and delivery of content.

From a use case perspective, a 6DoF experience consumed by a user may include a plurality of point cloud contents, or portions from these contents. As such, selective access for 6DoF content (the process of identifying and retrieving specific portions of content data) is an important function that is required for 6DoF immersive media.

A point cloud object compressed as V-PCC data includes a 3D bounding box that is defined by the number of bits used to encode point cloud data. In order to permit 6DoF access (spatial random access) of V-PCC data, the 3D bounding box may be divided into smaller 3D blocks or grids. The point cloud data within each 3D block may be declared with 2D V-PCC encoded data.

Figure 3:
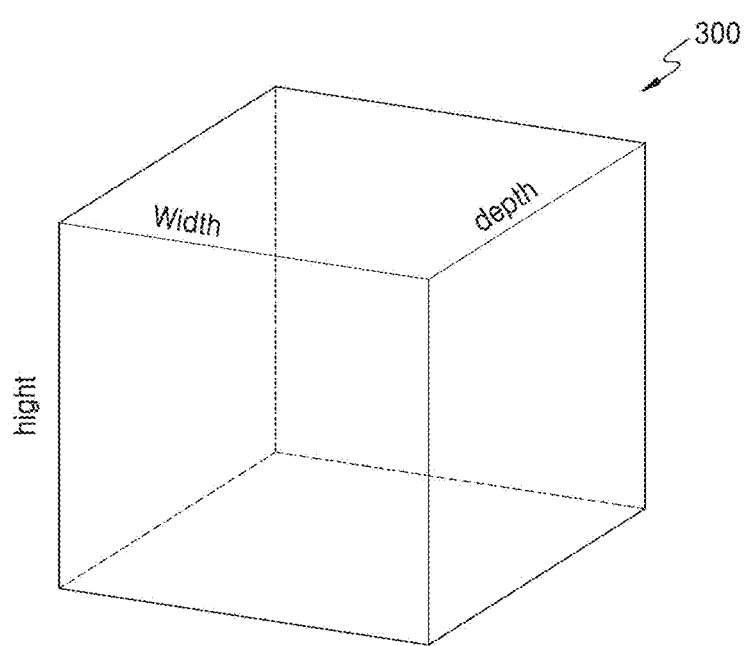
FIG. 3 illustrates a 6 degrees of freedom (6DoF) space defined in 6DoF content, according to an embodiment of the present disclosure.

FIG. 3 illustrates a 6DoF space defined in 6DoF content, according to an embodiment of the present disclosure.

The 6DoF space may be represented by a volumetric cuboid, a volumetric sphere, or a volumetric geometry, which may be defined in order to contain various 6DoF objects.

Referring to FIG. 3, the 6DoF space 300 is represented by a volumetric cuboid having a height, a width, and a depth.

For the 6DoF space represented by the volumetric cuboid, the metadata may be used to define the three lengths in the three dimensions of the cuboid (width, height, and depth). The units of the dimensions used to define the cuboid may be absolute units (millimeters, centimeters, meters, kilometers, etc.) or other units that are defined and referenced by the 6DoF space itself. A reference point for a coordinate system used in the 6DoF space may be each corner point of the cuboid or a spatial center inside the cuboid.

TABLE 1

```
aligned(8) class 6DoFSpaceStruct( ) {
    unsigned int(32) space_box_x_width;
    unsigned int(32) space_box_y_height;
    unsigned int(32) space_box_z_depth;
    unsigned int(4) space_units;
    unsigned int(8) space_origin;
}
```

Table 1 is an example of a syntax of 6DoF space metadata used to define a 6DoF space which is represented by a 3D cuboid and in which 6DoF content is placed.

space_box_x_width defines a width (x direction) of the cuboid 6DoF space, space_box_y_height defines a height (y direction) of the cuboid 6DoF space, and space_box_z_depth defines a depth (z direction) of the cuboid 6DoF space.

space_units defines units used in the 6DoF space and a size of the 6DoF space. According to an embodiment, a case in which space_units has a value of 0 may represent millimeters, a case in which space_units has a value of 1 may represent centimeters, a case in which space_units has a value of 2 may represent meters, a case in which space_units has a value of 3 may represent kilometers, a case in which space_units has a value of 4 may represent an internal reference defined by the 6DoF space, and a case in which space_units has other values may represent imperial units or any other kind of units.

space_origin defines an origin of a Cartesian coordinates used in the 6DoF space. According to an embodiment, a cases in which space_origin has a value of 0 to 7 may represent corner points of the cuboid, respectively, and a case in which space_origin has a value of 8 may represent an exact spatial center inside the cuboid.

Figure 4:
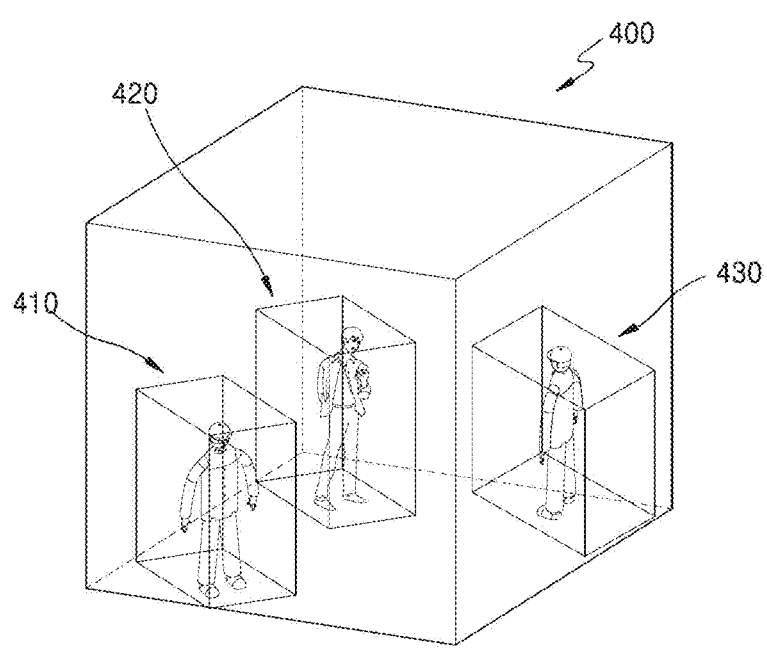
FIG. 4 illustrates 6DoF objects defined in a 6DoF space, according to an embodiment of the present disclosure.

FIG. 4 illustrates 6DoF objects defined in a 6DoF space, according to an embodiment of the present disclosure.

Referring to FIG. 4, a 6DoF space 400 may include three 6DoF objects 410, 420, and 430. In this case, the 6DoF objects are not limited to point cloud data and may include various media types.

When the 6DoF objects are defined, where the 6DoF objects are placed in the 6DoF space in order to compose the 6DoF content and scene has to be defined. This process may further include mechanisms to define the placement of the object in the space, scaling the object, rotating the object, and the like.

The 6DoF space may include at least one 6DoF object to be placed and rendered inside the 6DoF space. The 6DoF object to be placed inside the 6DoF space may be represented by various media types, such as point cloud data, 360 video data, or 2D video data. In the case of the point cloud data, each point cloud data representing the 6DoF object may be define by a local bounding box including all point clouds.

The size of the local bounding box is defined by x, y, and z, which are a width, a height, and a depth in three axes, respectively. The units used to define the width, the height, and the depth of the local bounding box are the same as the units used for the point cloud in the V-PCC.

A bounding box placement origin point and a 6DoF placement origin point are defined. A reference origin of a coordinate system used in the bounding box may be any of eight corner points of the bounding box, an exact center inside the cuboid, or any point inside the bounding box.

Figure 5:
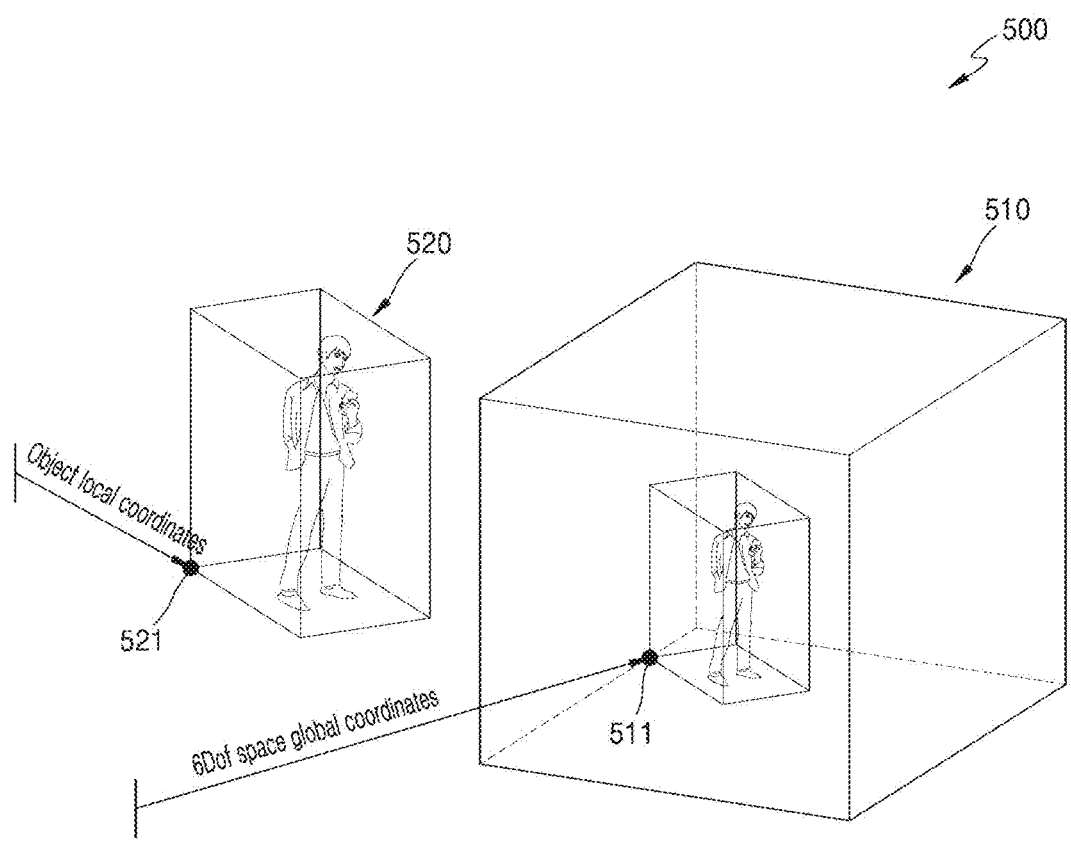
FIG. 5 is a diagram for describing a process of placing 6DoF objects in a 6DoF space, according to an embodiment of the present disclosure.

FIG. 5 is a diagram for describing a process of placing 6DoF objects in a 6DoF space, according to an embodiment of the present disclosure.

Referring to FIG. 5, a 6DoF object 520 represented by a bounding box may be placed in a 6DoF space 510.

When a bounding box of a point cloud 6DoF object is defined, a bounding box placement origin point is defined. Likewise, a 6DoF space placement origin point is defined.

In order to place the 6DoF object 520 in the 6DoF space 510, a bounding box placement origin point 521 and a 6DoF space placement origin point 511 have to match each other in the 6DoF space. A default orientation of the bounding box in the 6DoF space may be defined by matching orientations of reference coordinate systems for the 6DoF space and the bounding box.

From this default orientation, a rotation of the bounding box (and the point cloud data inside the bounding box) placed inside the 6DoF space may be defined. First, a static point in a bounding box domain and rotation angles around the corresponding point for each of the three axes are defined for the rotation.

The order and pose of the rotation has to be defined to rotate clockwise (when viewing down into a positive direction) around the x axis, clockwise (when viewing down into the positive direction) around the y axis, and clockwise (when viewing down into the positive direction) around the z axis.

In order to place the bounding box in the 6DoF space, a scaling factor of the bounding box (and the point cloud data inside the bounding box) for each of x, y, and z axes has to be defined.

TABLE 2

```
aligned(8) class 6DoFPlacementStruct( ) {
    unsigned int(8)     content_type;
    unsigned int(32) bounding_box_x_width;
    unsigned int(32) bounding_box_y_height;
    unsigned int(32) bounding_box_z_depth;
    unsigned int(32) box_placement_origin_x;
    unsigned int(32) box_placement_origin_y;
    unsigned int(32) box_placement_origin_z;
    unsigned int(32) scale_x;
    unsigned int(32) scale_y;
    unsigned int(32) scale_z;
    unsigned int(32) rotation_point_x;
    unsigned int(32) rotation_point_y;
    unsigned int(32) rotation_point_z;
```

TABLE 2-continued

```
    unsigned int(32) rotation_angle_x;
    unsigned int(32) rotation_angle_y;
    unsigned int(32) rotation_angle_z;
    unsigned int(32) space_placement_origin_x;
    unsigned int(32) space_placement_origin_y;
    unsigned int(32) space_placement_origin_z;
}
```

Table 2 is an example of a syntax of 6DoF placement metadata used to describe the rendering location of the corresponding 6DoF content (object) in the 6DoF space.

content_type defines a content media type representing the 6DoF object. According to an embodiment, a case in which content_type has a value of 0 may represent point cloud data, a case in which content_type has a value of 1 may represent 360-degree video data, a case in which content_type has a value of 2 may represent 2D video data, and the remaining values may remain reserved for other data types such as lightfield data.

bounding_box_x_width, bounding_box_y_height, and bounding_box_z_depth define the width (x direction), the height (y direction), and the depth (z direction) of the bounding box, respectively, in units used in point cloud represented by V-PCC.

box_placement_origin_x, box_placement_origin_y, and box_placement_origin_z define points of the bounding box representing the bounding box placement origin point in the bounding box domain, respectively.

scale_x, scale_y, and scale_z define the scaling factor used (in the x, y, and z directions of the bounding box) when placing the bounding box including the 6DoF object into the 6DoF space.

rotation_point_x, rotation_point_y, and rotation_point_z define x, y, and z coordinates, in the bounding box domain, of the point around which the certain rotation is applied to the bounding box when the bounding box is placed in the 6DoF space.

rotation_angle_x, rotation_angle_y, and rotation_angle_z define the clockwise rotations when viewing in the positive direction in the order of the x, y, and z axes, respectively.

space_placement_origin_x, space_placement_origin_y, and space_placement_origin_z define a point in the 6DoF space onto which the bounding box placement origin point is placed in the 6DoF domain. In this case, the bounding box placement origin point and the 6DoF space placement origin point are placed onto the same location.

As described above with reference to FIG. 5, when the bounding box is placed in the 6DoF space, a mechanism that enables partial delivery by dividing the space represented by a single point cloud (single 6DoF object) into 3D sections or blocks may be defined.

Due to the (large) size of data for point clouds, even a single 6DoF object represented by a single point cloud (which is encoded by using V-PCC and encapsulated into an ISOBMFF file by using the storage of V-PCC in an ISOBMFF storage mechanism) may include a very large amount of data, or may have a physically large volume in the 6DoF space. In this case, it may be advantageous to enable the partial delivery of point cloud data.

In order to enable the partial delivery of the point cloud data, the bounding box may be divided into 3D blocks or grids of smaller units, as defined when point cloud data is encoded by using V-PCC.

According to an embodiment of the present disclosure, in order to define the 3D blocks, the number of subdivisions of the bounding box for each axis is determined. For example, the total width of the bounding box may be divided into four sub-widths. Next, the width, height, and depth of each sub-block are defined. In this case, each sub-block may have a different size.

The size of the individual blocks or grids may be defined individually, but blocks may not overlap one another, and the sum of the widths of the sub-blocks has to be equal to the width of the bounding box. The same applies to the heights or depths of the sub-blocks.

6DoF access metadata for V-PCC is defined so as to describe the correspondence between a specific space within a V-PCC bounding box (PCC block) and its equivalent data location.

TABLE 3

```
aligned(8) class PCCBlockStruct( ) {
    unsigned int(32) bounding_box_x_width;
    unsigned int(32) bounding_box_y_height;
    unsigned int(32) bounding_box_z_depth;
    unsigned int(32) subdivisions_x;
    for (i = 0; i < subdivisions_x; i++) {
        unsigned int(32) subdivision_width;
    }
    unsigned int(32) subdivisions_y;
        for (j = 0; j < subdivisions_y; j++) {
            unsigned int(32) subdivision_height;
    }
    unsigned int(32) subdivisions_z;
    for (k = 0; k < subdivisions_z; k++) {
        unsigned int(32) subdivision_depth;
    }
}
```

Table 3 is an example of a syntax of PCCBlockStruct that defines a method of spatially dividing a V-PCC bounding box into blocks for data access.

bounding_box_x_width, bounding_box_y_height, and bounding_box_z_depth define the width (x-axis length), height (y-axis length), and depth (z-axis length) of the bounding box in units of integer points represented by point clouds in V-PCC. subdivisions_x, subdivisions_y, and sub-divisions_z are integers representing the number of subdivisions divided in each axis. subdivision_width, subdivision_height, and subdivision_depth define the width, height, and depth of a specific PCC block in the same units as the bounding box.

When the mechanism that divides the bounding box into sub-blocks is determined and the bounding box is divided, declaration metadata for V-PCC which identifies the location of the corresponding compressed data in a 2D V-PCC compressed domain and describes this is defined.

When the bounding box of the V-PCC compressed point cloud is divided into sub-blocks, the declaration of the compressed data that carries the data within the PCC blocks may be used for partial delivery and access of the V-PCC data. Correspondence between a PCC block and a V-PCC data location may be defined at different levels depending on how the V-PCC data was encoded and encapsulated. At the finest level, PCC blocks may correspond to V-PCC sub-frame data (e.g., motion constrained tile set (MCTS), macroblock/coding tree unit, or a group of pixels), and other PCC blocks may simply correspond to a specific set of V-PCC component tracks or a complete ISOBMFF file.

According to an embodiment of the present disclosure, the following metadata may be used to define the representation correspondence to V-PCC sub-frame data. For each PCC block, the number of regions including the corresponding data is defined and declared since data for a single PCC block may not be all included within a single continuous region in a 2D frame.

Each region may be defined as follows:
Rectangular pixel region declaration In this case, the corresponding region may be defined by the region's width and height and coordinates of a corner point corresponding to a top-left of a rectangular region.
MCTS identified by index ID as defined in HEVC
Slice segment identified by slice segment address
Coding tree unit (CTU) identified by CTU count
When declaration data is available in the V-PCC file, it may be further exposed to high levels for use in MMT or DASH
This declaration data may be used as follows:
Client entity that has to render 6DoF content identifies a portion of a 6DoF space to be displayed to a user.
This is delivered to a server as a request (when server driven) or is used as a requirement for a next operation (when client driven).
A server or a client (depending on delivery mode) parses 6DoF placement metadata, identifies 6DoF objects necessary for displaying and rendering a required space.
When the space includes a plurality of whole 6DoF objects, V-PCC compressed point cloud 6DoF is fetched as V-PCC files.
When the space includes only a portion that is represented by a V-PCC file PCC 6DoF object, the subdivision metadata is parsed and the subdivided PCC block(s) corresponding to the space is identified.
The identified PCC block(s) is then used as the input when parsing the declaration metadata in order to identify the data location of the encoded V-PCC data corresponding to the PCC block(s).
The V-PCC data is then fetched, delivered, accessed, decoded, and rendered by the client.

6DoF access metadata for V-PCC may be defined as follows:

TABLE 4

```
aligned(8) class VPCCBlockDeclarationStruct( ) {
    for (i = 0; i < subdivisions_x; i++) {
    for (j = 0; j < subdivisions_y; j++) {
    for (k = 0; k < subdivisions_z; k++) {
        unsigned int(8) num_regions;
        for(m = 0; m < num_regions; m++) {
            unsigned int(4) declaration_type[m];
            if(declaration_type[m] == 0) {
                unsigned int(32)    reg_width[m];
                unsigned int(32)    reg_height[m];
                unsigned int(16)    reg_top[m];
                unsigned int(16)    reg_left[m];
            if(declaration_type[m] == 1) {
                unsigned int(16)    mcts_id[m];
            if(declaration_type[m] == 2) {
                unsigned int(16)    slice_segment_address[m];
            if(declaration_type[m] == 3) {
                unsigned int(16)    CTU_count[m];
    }
    }
    }
    }
}
```

Table 4 is an example of a syntax of VPCCBlockDeclarationStruct for MCTS, slice segment, or CTU.

subdivisions_x, subdivisions_y, and subdivisions_z are integers specifying the number of subdivision blocks each axes is divided into.

subdivision_width, subdivision_height, and subdivision_depth specify the width, height, and depth of a specific PCC block in the same units as the bounding box.

num_regions specifies the number of 2D frame regions including V-PCC patch data corresponding to a specific PCC block volume. When this value is 0, this indicates that there is no V-PCC data corresponding to the specific PCC block volume.

declaration_type defines the granularity of the declaration for the 2D frame region.

TABLE 5

| Value | Declaration Type |
| --- | --- |
| 0x00 | Rectangular pixel region |
| 0x01 | Motion constrained tile set |
| 0x02 | Slice segment |
| 0x03 | Coding tree unit |
| 0x04~ | Reserved |

Table 5 shows the declaration type according to the value of declaration_type.

Since all the 6DoF metadata described above are varied according to time, the 6DoF metadata may be included in the V-PCC metadata track of the ISOBMFF file. Alternatively, a separate 6DoF container timed metadata track may be defined to include the metadata.

In order to compress point cloud data by using an existing video codec, original point cloud data has to be pre-processed.

The point cloud data may include the location of a point in a 3D space, which is specified by (x, y, z) coordinates, information (r, g, b) about a texture of the point at the corresponding location, and optional data that may be included in each point. Therefore, a minimum data set capable of describing a single point cloud is (x, y, z, r, g, b).

Accumulated data for all points in the point cloud are stored in a polygon file format (.ply) that simply lists data set for each point in a file (without rearrangement or compression).

Since a general video codec supports only three inputs (r, g, b) during an encoding process, point cloud data components are separated into components that are delivered to each encoder.

Figure 6:
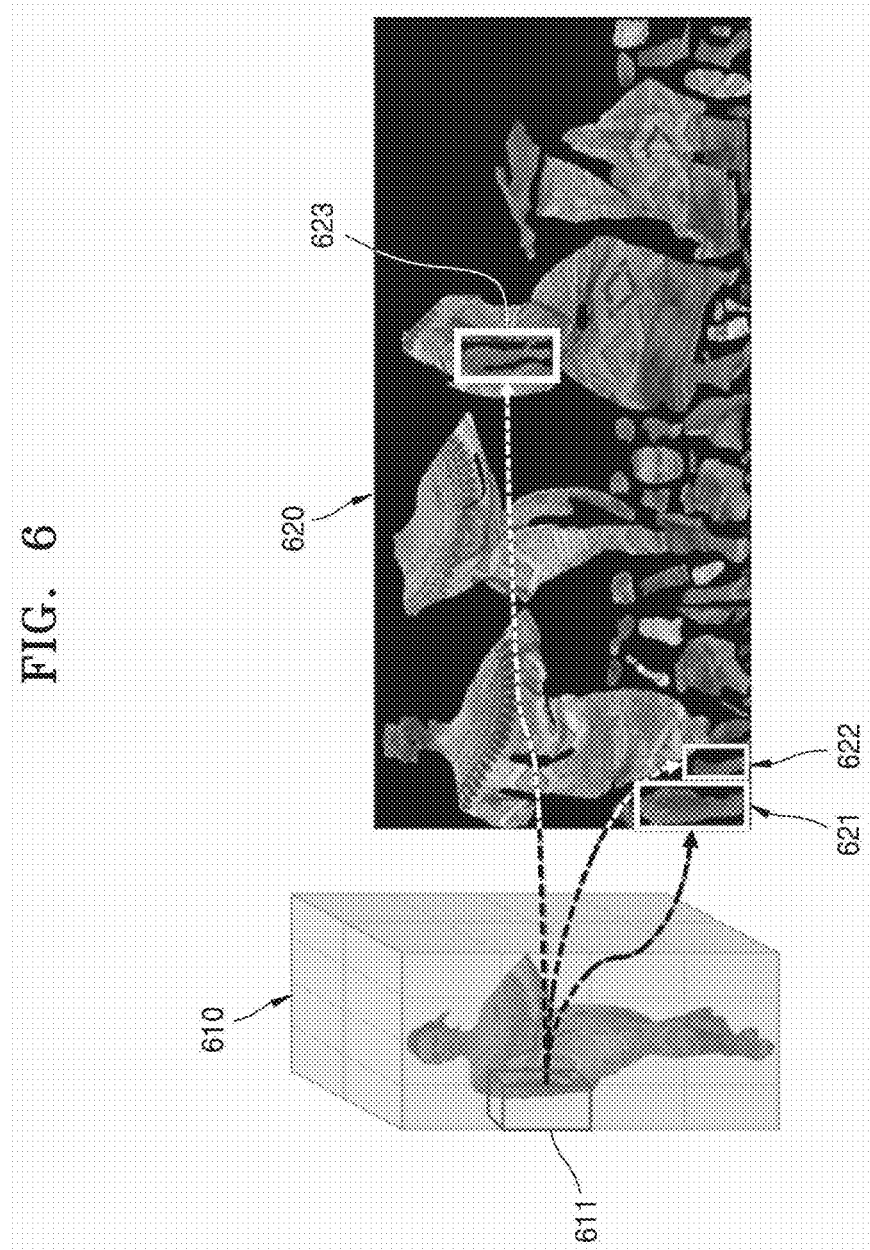
FIG. 6 is a diagram illustrating a patch that divides a 3D point cloud object and includes video-based point cloud compression (V-PCC) data corresponding to the divided object, according to an embodiment of the present disclosure.

FIG. 6 is a diagram illustrating a patch that divides a 3D point cloud object and includes V-PCC data corresponding to the divided object, according to an embodiment of the present disclosure.

Since the point cloud is volume-based, the size of data required to represent point clouds is large, even with compression. Therefore, the partial spatial access of such point cloud data is an important tool that may be used to support the delivery of point cloud 6DoF content.

Volumetric point clouds may be spatially divided for spatial access and delivery of content.

From a use case perspective, a 6DoF experience consumed by a user may include a plurality of point cloud contents, or portions from these contents. As such, selective access for 6DoF content (the process of identifying and retrieving specific portions of content data) is an important function that is required for 6DoF immersive media.

A point cloud object compressed as V-PCC includes a 3D bounding box that is defined by the number of bits used to encode point cloud data. In order to permit 6DoF access (spatial random access) of V-PCC data, the 3D bounding box may be divided into smaller 3D blocks or grids. The point cloud data within each 3D block may be declared with 2D V-PCC encoded data.

Referring to FIG. 6, the point cloud object may be represented by a 3D bounding box 610, and the 3D bounding box may be divided into smaller sub-blocks 611. A 2D patch 620 obtained by video-encoding the bounding box 610 may include portions 621, 622, and 623 of the sub-block 611.

In FIG. 6, it is assumed that the sub-block 611 corresponds to a right arm of a point cloud object (person), and a user looks at the right arm of the object from the right side of the object. In such a case, considering a viewport, a data area corresponding to the viewport of the sub-block 611 in the 2D patch 620 corresponds to the portions 621, 622, and 623 of the 2D image when viewed by projecting the right arm in a right direction.

In order to describe this correlation, 6DoF declaration metadata is proposed. In order to partially access and deliver V-PCC content, 6DoF access metadata for V-PCC data carrying spatial correspondence information has to be introduced. Details of the 6DoF declaration metadata and the 6DoF access metadata have been described above.

Figure 7:
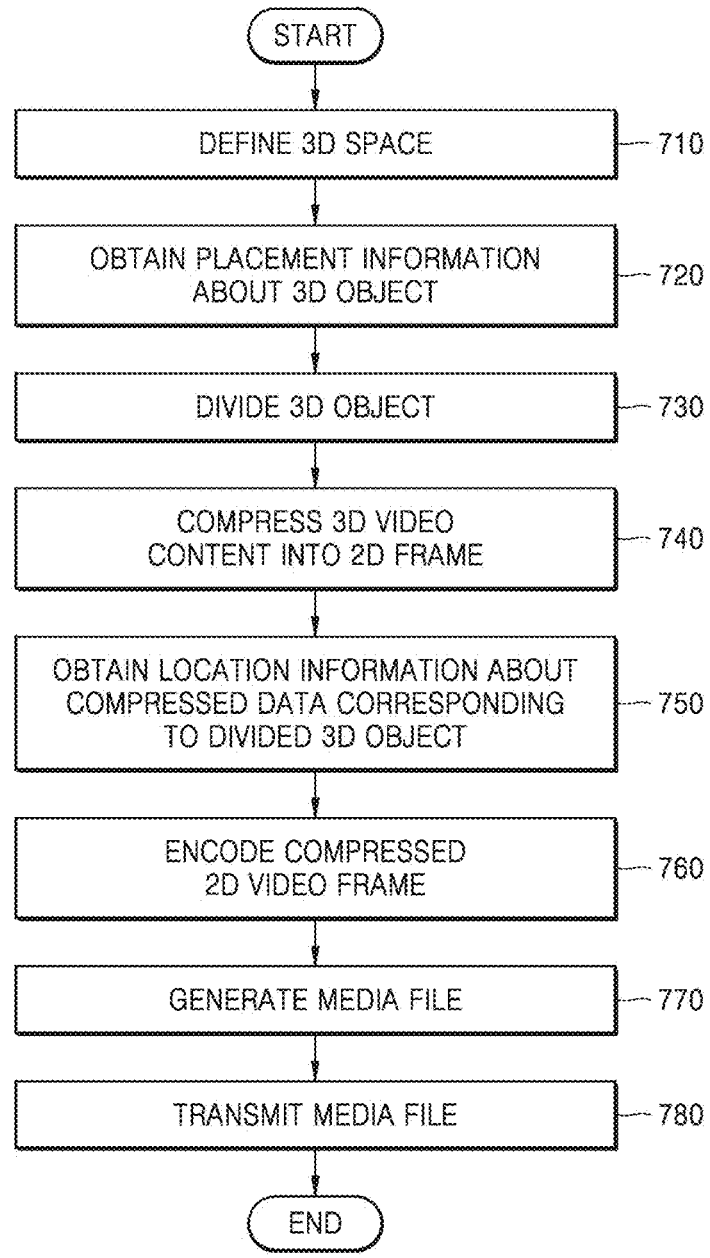
FIG. 7 illustrates a flowchart of a method of transmitting 3D video content, according to an embodiment of the present disclosure.

FIG. 7 illustrates a flowchart of a method of transmitting 3D video content, according to an embodiment of the present disclosure.

Referring to FIG. 7, the method of transmitting 3D video content, according to the embodiment of the present disclosure, may include the following operations. In this case, the 3D video content may be 6DoF content. In addition, 6DoF objects are not limited to point cloud data and may include various media types.

In operation 710, a 3D space for placing the 3D objects is defined. The 3D space may be represented by a cuboid, a sphere, or other geometry. When the 3D space is represented by the cuboid, the 3D space may be defined as lengths of three surfaces and units of lengths, and a reference point for placement may be each corner point of the cuboid or a spatial center inside the cuboid.

In operation 720, placement information about at least one 3D objects to be placed in the 3D space is obtained. When the 3D objects are defined, where the 3D objects are to be placed in the 3D space has to be defined. The placement information about the 3D objects may include not only information regarding the placement of the objects but also scaling information and rotation information.

In the case of point cloud data, the 6DoF object may be defined by a local bounding box. The 3D object may be placed by matching a bounding box placement origin point and a 3D space placement origin point.

In operation 730, the 3D object is divided. The 3D space may be divided so as to apply a partial delivery or a separate encoding method for each portion.

In the case of point cloud data, the number and length of sub-blocks divided for each axis of the bounding box may be defined, and the sum of the lengths of the sub-blocks for each axis has to be equal to the length for each axis of the bounding box.

In operation 740, the 3D video content including the divided at least one 3D object is compressed into a 2D frame.

The point cloud may be compressed by using V-PCC, and a point cloud object compressed with V-PCC includes a 3D bounding box, which is defined by bits used to encode the point cloud data, and sub-blocks thereof In operation 750, location information about the compressed data corresponding to the divided 3D object is obtained from the 2D video frame.

In the V-PCC, 6DoF access metadata that carries spatial correspondence information for partial access and delivery of content is defined.

In operation 760, the compressed 2D video frame is encoded.

In the V-PCC, point cloud data inside each 3D block is declared with 2D V-PCC encoded data and is encoded by using an existing video encoder such as HEVC.

In operation 770, a media file including the encoded 2D video frame and the location information about the compressed data is generated. In operation 780, the generated media file is transmitted.

The generating of the media file includes encapsulating the data into the media file. The transmitting of the media file includes packetizing and transmitting the encapsulated media file.

Figure 8:
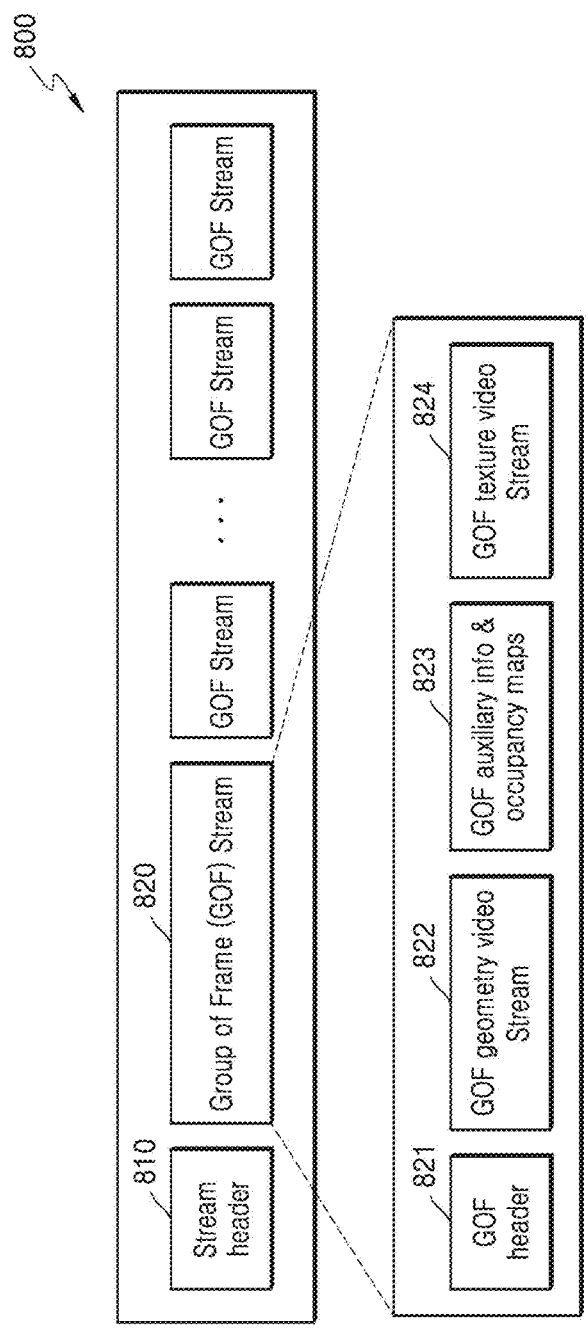
FIG. 8 illustrates an output of a V-PCC module, according to an embodiment of the present disclosure.

FIG. 8 illustrates an output of a V-PCC module, according to an embodiment of the present disclosure.

Referring to FIG. 8, an output 800 of a V-PCC module may include a stream header 810 and at least one group of frame (GOF) stream 820. Each GOF includes 32 frames of point cloud, that is, instances of point cloud over consecutive time intervals. At this time, the exact time interval may be arbitrarily determined according to a capturing process.

Each GOF stream may include a GOF header 821, a GOF geometry video stream 822, GOF auxiliary information and occupancy maps 823, and a GOF texture video stream 824. The GOF header 821 includes encapsulated GOF structure metadata. The GOF geometry video stream 822 includes (x, y, z) components of point cloud data. The GOF texture video stream 823 includes (r, g, b) components of point cloud data.

In order to video-compress the GOF stream 820 including the geometry stream 822, the GOF texture video stream 824, and the GOF auxiliary information and occupancy maps 823, pre-processing and post-processing for representing 3D information by scenes of 2D information are required.

Unlike technology in which whole .ply files are delivered and point cloud data is rendered, the dynamic point cloud for immersive media has to support temporal random access and delivery of the point cloud media, spatial random access and delivery of the point cloud media, and quality adaptation of the point cloud media.

For the dynamic point cloud media, each point cloud frame includes components that are all essential for the decoding of the point cloud frame, and each component may be encoded, encapsulated, and delivered in a different manner to other components. Therefore, a point cloud access unit (AU) has to be newly defined. The "access unit" refers to the smallest data unit that attributes data at a system layer for synchronization of compression.

Figure 9:
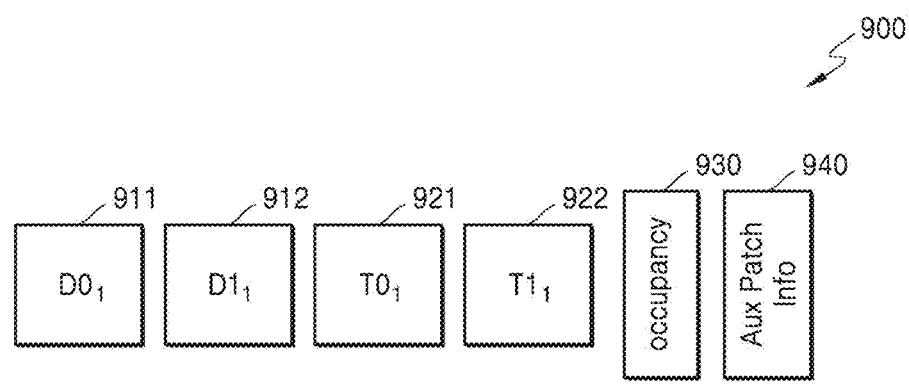
FIG. 9 illustrates a point cloud access unit according to an embodiment of the present disclosure.

FIG. 9 illustrates a point cloud access unit according to an embodiment of the present disclosure.

Referring to FIG. 9, a point cloud access unit 900 may include access units ($D0_1$ and $D1_1$) 911 and 912 for depth information, access units ($T0_1$ and $T1_1$) 921 and 922 for texture information, an access unit 930 for occupancy map information, and an access unit 940 for auxiliary patch information. In this case, the access units ($D0_1$ and $D1_1$) 911 and 912 for the depth information represent depth information about a single point cloud frame, and the access units ($T0_1$ and $T1_1$) 921 and 922 represent depth information about a single point cloud frame. The occupancy information and the patch information may be regarded as essential metadata required for the decoding of the point cloud access unit.

According to another embodiment, a single D frame may be included instead of the access units ($D0_1$ and $D1_1$) 911 and 912 for the depth information, and a single T frame may be included instead of the access units ($T0_1$ and $T1_1$) 921 and 922. According to another embodiment, the occupancy information and the auxiliary patch information may be encoded by using other encoders other than video encoders.

The use of video encoders such as HEVC may introduce temporal dependency between video frames of the same stream, for example, between $D0_1$ and $D1_1$, depending on the encoding configurations, which may be different for each component for the point cloud access unit. The temporal frequency or variation of each component may be also different according to each component of the point cloud access unit, and the point cloud access unit that does not include video frames or does not include occupancy/auxiliary patch information may be generated.

Compressed point cloud data may be encapsulated in an ISOBMFF file and delivered. The ISOBMFF stores media samples and defines metadata for presentation as well as other metadata for other uses for each corresponding sample.

Actual media data is stored in a media data box (mdat), and all the metadata associated with the media data is included in a movie box (moov). A sample entry type field that exists within a sample description box (stsd) defines a track type (video, audio, meta, or hint track). A new media handler type and a coding sample entry type are defined for point cloud compressed media data for tracks that carry each component of the point cloud media.

Signaling of PCC media data may be defined in ISOBMFF by using the following five methods:

1. Definition of point cloud media type, sample entry, and components carried in a plurality of tracks
2. Definition of point cloud media type and sample entry, sub-sample predefinition in media type coding format, and sub-samples as separate components of point cloud media
3. Sample grouping for various point cloud media components
4. Restricted sample entry scheme that uses auxiliary video handler for HEVC based components, and timed metadata or sample auxiliary information for other components
5. Definition of point cloud media type and sample entry, for which these samples in a track include non-video coded components of point cloud media, including references to other tracks which include video coded components. At this time, the video coded tracks use the restricted sample entry scheme, with a new scheme type 'pccv' defined.

In order to use the above-described methods, the following contents have to be newly define for point cloud media.

Point cloud media handler and type
Point cloud sample entry and type (for both when a single point cloud sample consists only of one component with references to other tracks, and when a single point cloud sample consists of a plurality of components in the same sample)
When the definition of a single point cloud sample includes all point cloud media components, sub-sample definition and boundaries for each sample is needed
Track level information.

Figure 10:
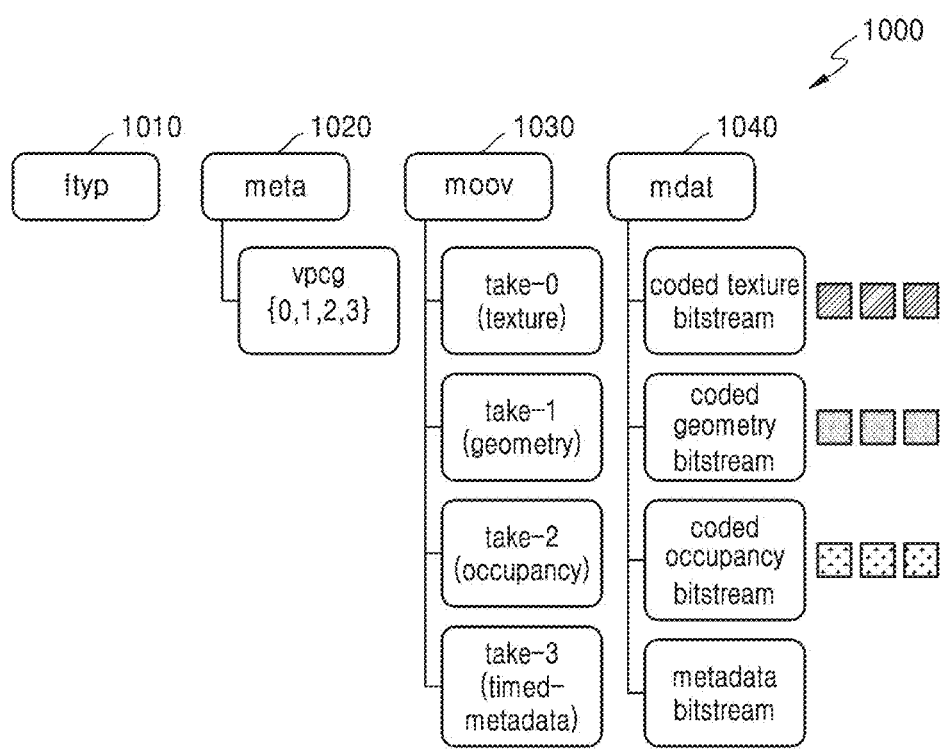
FIG. 10 illustrates an International Organization for Standardization (ISO)-based media file format (ISOBMFF) file structure according to an embodiment of the present disclosure.

FIG. 10 illustrates an ISOBMFF file structure according to an embodiment of the present disclosure.

According to an embodiment, a transmission apparatus 1000 may generate and transmit an ISOBMFF file including V-PCC content.

FIG. 10 illustrates an example in which point cloud data is stored in an ISOBMFF media file, according to an embodiment of the present disclosure. In FIG. 10, an EntityToGroupBox-based track design of MetaBox of ISOBMFF is used as an embodiment related to track design for a PCC stream.

A V-PCC bit stream is a collection of video streams (geometry, texture, and occupancy maps) and static metadata, which are independently decodable according to associated time. ISOBMFF already provides a proven structure for signaling and encapsulating a set of streams. The track structure of ISOBMFF is suitable for timed streams (video and timed metadata). Sample items, sample groups, or track level metadata boxes are suitable for static metadata. This embodiment presents a proposal for track level design.

Referring to FIG. 10, a V-PCC ISOBMFF file structure 1000 according to an embodiment of the present disclosure may include an ftyp box 1010, a meta box 1020, a moov box 1030, and an mdat box 1040.

The ftyp box (file type box) 1010 may provide file type or compatibility related information about the media file.

The moov box (movie box) 1030 may be a box that includes metadata about media data of the media file. The moov box may serve as a container for all metadata.

The mdat box (media data box) 1040 may be a box containing actual media data of the media file. Media data may include audio samples and/or video samples, and the mdat box may serve as a container for storing these media samples.

The transmission apparatus 1000 according to the embodiment of the present disclosure may carry a plurality of V-PCC components in a plurality of tracks in carrying the V-PCC content in the ISOBMFF.

In mapping the compressed V-PCC component streams to individual tracks, a logical track may be included in the moov box 1030 and the actual compressed data may be included in the mdat box 1040 in the form of samples.

The meta box (metadata box) 1020 may include one or more V-PCC group boxes, and the V-PCC group box may provide a track list of V-PCC content. The ISOBMFF file including the V-PCC content has to be distinguished from brands defined in the V-PCC. Tracks of the V-PCC content has to be grouped inside a file-level EntityToGroupBox with a V-PCC specific grouping 4CC value ('vpcg'). All metadata that is common to the V-PCC content is specified in the EntityToGroupBox. The EntityToGroupBox provides an entry point to access the V-PCC content.

The V-PCC metadata may be included in the timed metadata track. The carriage of the timed metadata may be handled in the same or similar manner as the carriage of the video tracks. The V-PCC specific sample entry type of the timed metadata track 'vpcm' may be specified.

In general, metadata required for a V-PCC solution may be divided into stream level, GOF level, or information available per frame. Therefore, the following ISOBMFF structure may be proposed. It is assumed that the V-PCC coding specification defines the data structure included below.

For example, stream level metadata has to be used globally and has not to be changed over time due to static characteristics. Therefore, the stream level metadata may be stored in the V-PCC specific EntityToGroupBox 'vpcg' that is included in the file-level MetaBox.

Table 6 below shows the definition of the V-PCC group box.

TABLE 6

| Box Type: | 'vpcg' |
|---|---|
| Container: | GroupListBox |
| Mandatory: | Yes |
| Quantity: | One or more |

The V-PCC group box provides the list of tracks of the V-PCC content. For flexible configuration of V-PCC content supporting a variety of client (terminal) capabilities, various versions of encoded data components may be referenced. V-PCC defined profile and tier level information may be included in the V-PCC group box.

Table 7 below is a syntax of the stream level metadata stored in the V-PCC specific EntityToGroupBox 'vpcg'.

TABLE 7 aligned(8) class VPCCGroupBox( ) extends EntityToGroupBox('vpcg', version, flags) {
    for(i=0; i<num_entities_in_group; i++){
        unsigned int(4)    DataType;
        unsigned int(3)    layer_id;
        bit(4)reserved = 0;
    }
    vpcc_profile_tier_level( ) //defined in V-PCC spec
}

In the syntax of Table 7, DataType indicates a type of PCC data in a referenced track as listed in Table 8.

TABLE 8

| value | PCC Data Type |
|---|---|
| 0x00 | reserved for ISO use |
| 0x01 | metadata track |
| 0x02 | geometry video track |
| 0x03 | texture video track |
| 0x04 | occupancy map video track |
| 0x04~0x0E | reserved for ISO use | layer_id specifies the layer identifier for the associated track. The V-PCC timed metadata track has to have layer_id equal to 0. When aligned in increasing order, layer_id for restricted video scheme type has to be a contiguous set of integers starting from 0. vpcc_profile_tier_level( ) may be specified in [V-PCC coding specification].

The entry point for each V-PCC content is represented by a unique timed-metadata track. Since an ISOBMFF file may include a plurality of V-PCC contents, a plurality of timed-metadata tracks may be present in the file. A V-PCC metadata track has to be identified by a media handler type 'vpcc'. The VPCCMetadataSampleEntry has to be used in the sample description of the V-PCC metadata track. The VPCCMetadataSampleEntry will be described below.

Table 9 below shows the definition of the V-PCC metadata track.

TABLE 9

| Sample Entry Type: | 'vpc1' |
|---|---|
| Container: | Sample Description Box ('stsd') |
| Mandatory: | No |
| Quantity: | 0 or 1 |

The timed metadata track of the PCC metadata track may be included in an stsd box (sample description box) of the PCC metadata track. An stsd box may be included in an stbl box (sample table box), an stbl box may be included in a minf box (media information box), and a minf box may be included in an mdia box (media box) of the PCC metadata track.

A track sample entry type "vpc1" may be used as the sample entry type of the timed metadata track. The sample entry of the sample entry type may be specified by Table 10 below.

TABLE 10

```
aligned(8) class VPCCMetadataSampleEntry( ) extends
MetadataSampleEntry ('vpcl') {
    VPCCParameterSets ( );
}
```

Each sample in the V-PCC metadata track corresponds to a single point cloud frame. Samples corresponding to this frame in the various component tracks have the same composition time as the V-PCC metadata sample. Each sample includes parameter set information and auxiliary information.

The PCC metadata track may include static configuration parameters (which do not change over time) in the sample entry and may include dynamic auxiliary information or dynamic patch information which changes according to frames within the sample format.

Each sample of the PCC metadata track may generate a single point cloud instance (point cloud "frame"). The decoding time of various components (auxiliary information, occupancy map, geometry, and texture) of one point cloud instance is the same as the PCC metadata sample decoding time (defined as sample box 'stts' using decoding time). Therefore, all samples of other tracks referenced by the PCC metadata sample have to have the same decoding timestamp.

Meanwhile, each sample may include both auxiliary information and occupancy map data or only auxiliary information depending on whether there is an occupancy map data stream compressed by a separate 2D video codec.

The sample syntax of the sample entry type 'pccl' may be specified by Table 11 below.

TABLE 11

```
aligned(8) PCCMetadataSample( ) {
    VPCCParameterSets ( );
    AuxiliaryInfoStruct( );
}
```

In order to link the V-PCC metadata to the video track component, the track reference tool of the ISOBMFF standard is used.

Three TrackReferenceTypeBoxes are added to a TrackReferenceBox within the TrackBox of the V-PCC metadata track, one for each component. The TrackReferenceTypeBox includes an array of track_IDs designating the video tracks that the V-PCC metadata track references. The reference_type of the TrackReferenceTypeBox identifies the type of the component (i.e., geometry, texture, or occupancy map).

4CCs of the new track reference types are 'pcct', 'pccg', and 'pcco'. 'pcct' may refer to the referenced track(s) including the video-coded texture V-PCC component, 'pccg' may refer to the referenced track(s) including the video-coded geometry V-PCC component, and 'pcco' may refer to the referenced track(s) including the video-coded occupancy map V-PCC component.

The carriage of coded video tracks that use MPEG specified codecs are well defined in ISOBMFF derived specifications. Since it is not meaningful to display the texture, geometry, or occupancy map tracks without reconstructing the point cloud at the player side, a restricted video scheme type is defined for these video-coded tracks. The V-PCC video tracks use 4CC 'pccv' as the type for the restricted video scheme.

There is no restriction on the video coder used for encoding the texture, geometry, and occupancy map, which are the V-PCC components.

Figure 11:
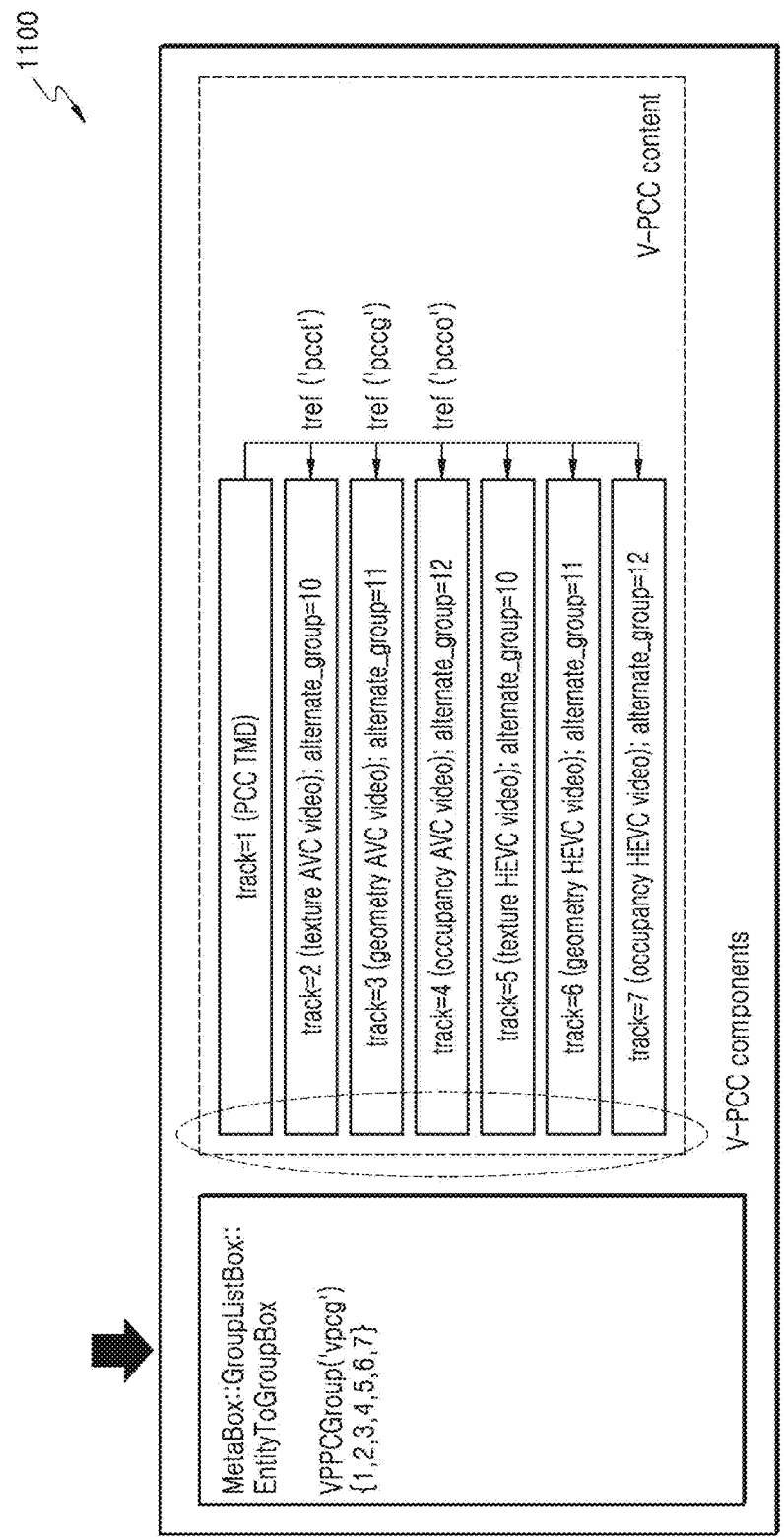
FIG. 11 illustrates track alternatives and grouping for storing V-PCC content in an ISOBMFF file, according to an embodiment of the present disclosure.

FIG. 11 illustrates track alternatives and grouping for storing V-PCC content in an ISOBMFF file, according to an embodiment of the present disclosure.

An ISOBMFF container 1100 may include a plurality of V-PCC contents, different versions of the same content, or different contents. All tracks of the V-PCC content may be identified by using the entity grouping that is a tool in ISOBMFF, for example, by adding the related tracks to EntityToGroupBox ('vpcg').

All tracks that may be alternatives of each other may be indicated by the track alternate mechanism defined in ISOBMFF, such as an alternate_group field of TrackHeaderBox ('tkhd'). Tracks that have the same alternate_group field have to be different encoded versions of the same V-PCC component.

V-PCC metadata tracks that belong to the same V-PCC content have to be indicated as alternative tracks. Otherwise, V-PCC metadata tracks are treated as entry tracks for different V-PCC contents.

When movie fragments are used to provide streaming of V-PCC content, parameter set information has to be introduced in SampleGroupDescriptionBox of type 'vpgd' included in MovieFragmentBox in the V-PCC metadata fragments.

Sample entry of sample entry type 'vpgd' for ISOBMFF fragmented design may be specified by Table 12 below.

TABLE 12

```
aligned(8) class VPCCMetadataSampleGroupEntry( ) extends
SampleGroupDescriptionEntry('vpgd'){
    VPCCParameterSets ( );
}
```

Figure 12:
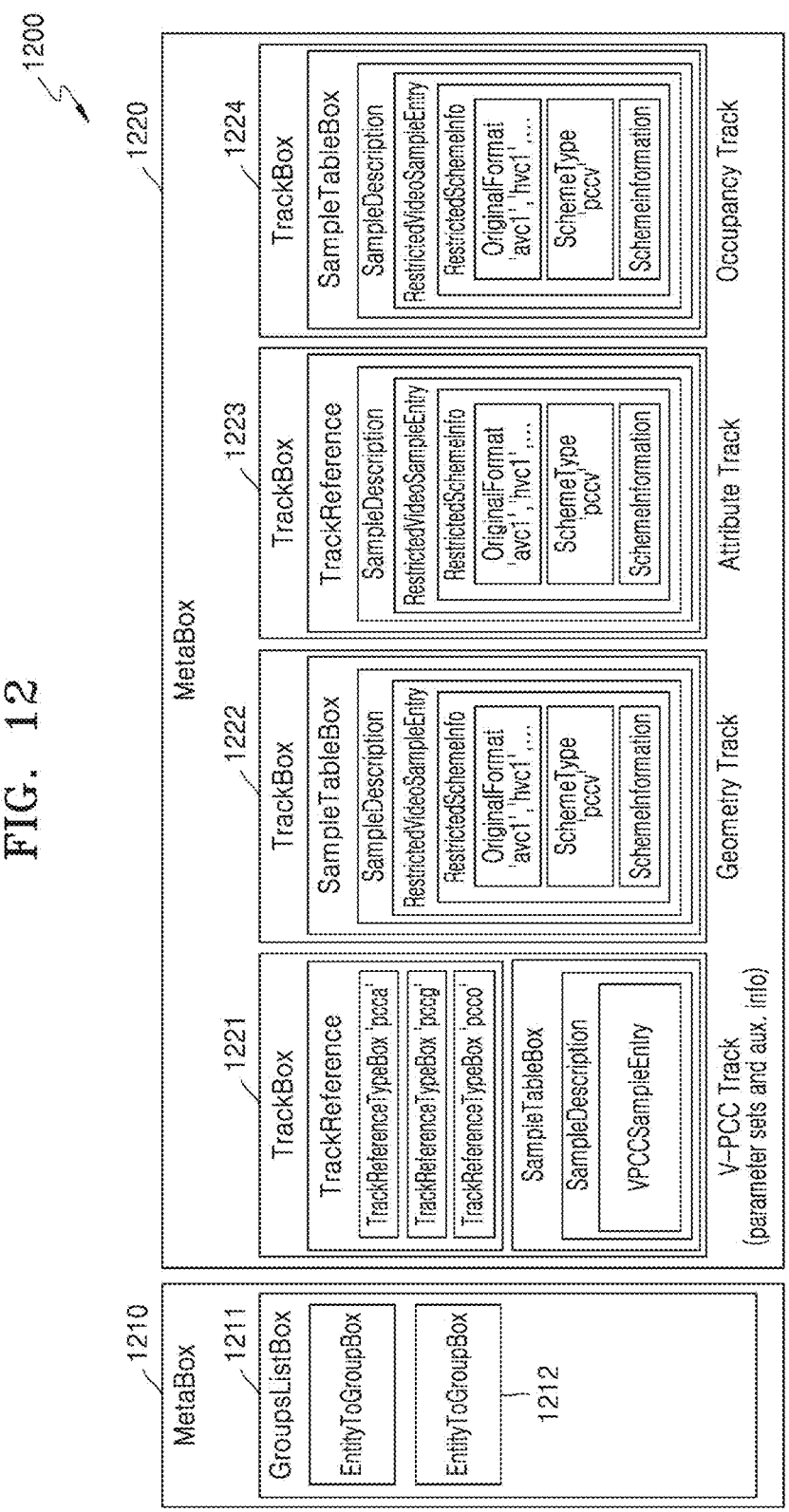
FIG. 12 illustrates an ISOBMFF V-PCC container structure according to an embodiment of the present disclosure.

FIG. 12 illustrates an ISOBMFF V-PCC container structure according to an embodiment of the present disclosure.

A V-PCC ISOBMFF file including a single object for V-PCC content has the following structure.

A file level box including metadata, which is used as the entry point for the content and provides high level information regarding various tracks constituting the content in the file. The file level box includes at least one V-PCC track including point cloud media samples.

As the "base" track for the V-PCC content, the V-PCC track includes track reference boxes of various types, referencing various video encoded component tracks constituting the V-PCC content.

In the absence of any multiplexing or re-encapsulation of the V-PCC data components (and file metadata), ISOBMFF has to have at least the following components.

4 media tracks that are related to visual media
3 video tracks (geometry, texture, occupancy)
One V-PCC track including non-video coded data and track references
A file level box that provides the list of tracks constituting V-PCC content. This box includes V-PCC related information, such as mapping of attribute types and layers to the related tracks.

Referring to FIG. 12, the ISOBMFF V-PCC container may include a MetaBox 1210 and a MovieBox 1220.

The MetaBox 1210 may include a GroupListBox 1211, and the GroupListBox may include an EntityToGroupBox

1212. The EntityToGroupBox 1212 refers to an entry point of a PCC file that provides initial high level information of V-PCC content.

The MovieBox 1220 may include a V-PCC track 1221, a geometry track 1222, an attribute track 1223, and an occupancy track 1224. The metadata track 1221 refers to an entry point of V-PCC content including the sequence and frame parameter sets defined in the V-PCC by addition to other compressed metadata. The geometry track 1222, the attribute track 1223, and the occupancy track 1224 refer to video tracks for video coded components of a V-PCC stream.

The V-PCC content may include a geometry data elementary stream, a texture data elementary stream, an occupancy map data elementary stream, and a metadata elementary stream.

The geometry data elementary stream, the texture data elementary stream, and the occupancy map data elementary stream are compliant with independent 2D video codecs and may be stored as compatible 2D video media tracks. The metadata elementary stream has to provide the entry point of the PCC file and also provide the reference to the geometry data elementary stream, the texture data elementary stream, and the occupancy map data elementary stream.

Samples of frame auxiliary information, occupancy map frames, geometry frames, and texture frames, which constitute a single PC frame, have to have the same decoding time. Therefore, the V-PCC parameter sets used for such samples have to have a decoding time equal to or prior to the decoding time of the frame.

Tracks of a single V-PCC file may be grouped by using a file-level EntityToGroupBox with a V-PCC specific grouping 4CC value (for example, visual point cloud group 'vpcg'). All metadata that is common to the single V-PCC stream may be specified in the V-PCC specific EntityToGroupBox. The EntityToGroupBox may serve as the entry point to access the V-PCC content.

The carriage of coded video tracks that use MPEG specified codecs are well defined in ISOBMFF derived specifications. For example, the carriage of AVC and HEVC coded videos are defined in the 14496-15 specification. When other codec types are required, ISOBMFF also provides an extension mechanism (see Annex C of 14496-12).

Since it is not meaningful to display the texture, geometry, or occupancy map tracks without reconstructing the point cloud at the player side, restricted video scheme types 'pcct', 'pccg', and 'pcco' may be specified and used for PCC tracks.

Figure 13:
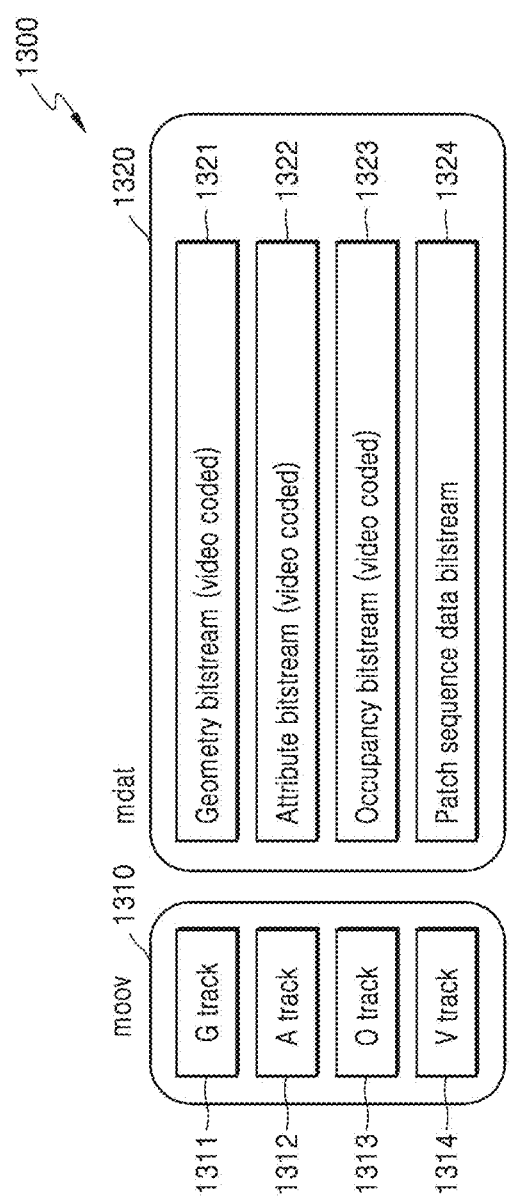
FIG. 13 illustrates tracks and media data, which are included in a movie box and a media data box in an ISOBMFF file, according to an embodiment of the present disclosure.

FIG. 13 illustrates tracks and media data, which are included in a movie box and a media data box in an ISOBMFF file, according to an embodiment of the present disclosure.

Referring to FIG. 13, an ISOBMSS file 1300 may include a movie box (moov) 1310 including tracks for various V-PCC components associated with single point cloud content, and a media data box (mdat) 1320 including media data.

The movie box 1310 includes file metadata defining other tracks in the file, but the actual media data are stored together in the media data box 1320.

The movie box 1310 may include a G track 1311 including metadata for geometry among components associated with single point cloud content, an A track 1312 including metadata for an attribute (texture), an 0 track 1313 including metadata for occupancy (occupation map), and a V track 1314 including non-video coded data and track reference information for the V-PCC.

The media data box 1320 may include a geometry bitstream 1321 including media data for the geometry among components associated with single point cloud content, an attribute bitstream 1322 including media data for the attribute (texture), an occupancy bitstream 1323 including media data for the occupancy (occupation map), and a patch sequence data bitstream 1324 including information about the V-PCC. In this case, the bitstreams 1321, 1322, and 1323 associated with the G, A, and 0 tracks 1311, 1312, and 1313 may be video-coded, and the bitstream 1324 associated with the V track 1314 may be coded by other methods.

Figure 14:
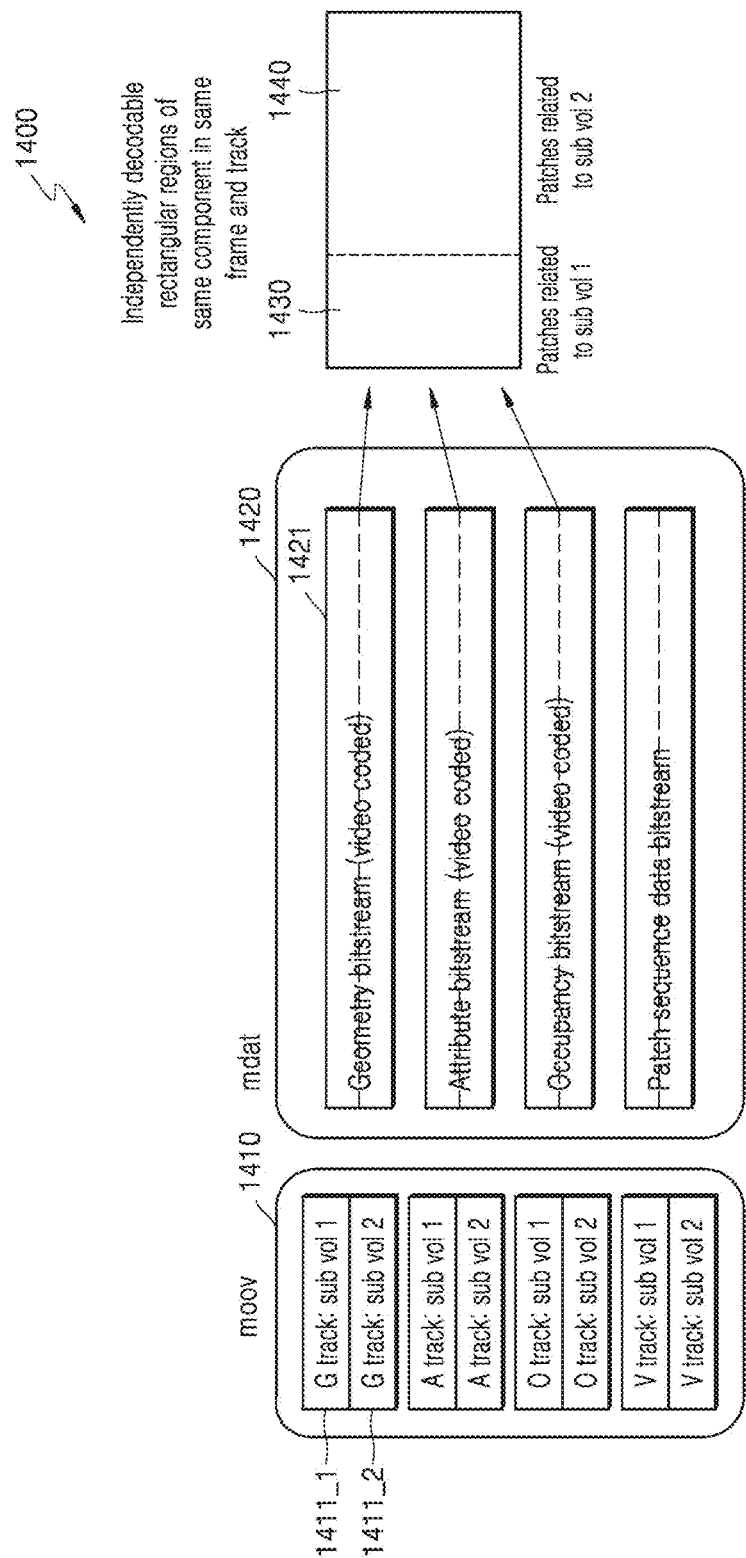
FIG. 14 illustrates a method of encapsulating data for each sub-volume in an ISOBMFF file into a single track when point cloud content is divided, according to an embodiment of the present disclosure.

FIG. 14 illustrates a method of encapsulating data for each sub-volume in an ISOBMFF file into a single track when point cloud content is divided, according to an embodiment of the present disclosure.

As described above, when a PCC object in a file occupies a large space (e.g. a football pitch, a room, a building, etc.), a large number of points exist in a point cloud. Therefore, an amount of data to be decoded is increased, and computational complexity of rendering is increased. Therefore, spatial access to the space according to the location of the viewer or the user is important.

In addition, when the object is already encoded with the spatial partial access metadata defined in the file and the coding structure is defined in the file, the same metadata may be used to extract media data for partial volumes of the 3D content and its corresponding metadata, and the corresponding data may be delivered separately from other parts of the object. In this case, the media data and its corresponding metadata may be separately encapsulated into partial access tracks or files.

As described above, for spatial partial access, the following metadata is required.

Metadata that identifies part of the point cloud object in the 3D space and divides the bounding box used to encode the object into different 3D grids For 3D grids representing the partial portion of the object, data required for the rendering of the content is declared. For V-PCC, a 2D rectangular pixel region in video frames (geometry, texture, and occupancy frames) of different components required for the decoding of the point cloud data is generally required. When patch related metadata is also capable of being separated spatially, the location of the metadata declared in the file may be also extracted.

According to an embodiment of the present disclosure, when the data corresponding to the spatial divisions as defined in the metadata is encoded such that the divided point cloud content (portion of divided object) is independently decodable, the client is capable of accessing, decoding, and rendering the relevant required data.

Referring to FIG. 14, an ISOBMFF file 1400 may include a movie box (moov) 1410 including tracks for various V-PCC components related to single point cloud content, and a media data box (mdat) 1420 including media data.

It is assumed that the object is divided into two sub-volumes, and various components associated with the point cloud content are divided into independently decodable rectangular regions such that each region corresponds to the sub-volume of the point cloud content.

In FIG. 14, the moov box 1410 includes four tracks, that is, G, A, O, and V tracks as in FIG. 13.

However, unlike in FIG. 13, each track includes two independently decodable regions. For example, the G track 1411 may store geometry information 1411_1 for sub-volume 1 and geometry information 1411_2 for sub-volume 2 in different regions. When a specific component uses two or more layers for encoding, additional tracks may exist.

As in FIG. 13, the mdat box 1420 includes a geometry bitstream, an attribute bitstream, an occupancy bitstream, and a patch sequence bitstream. However, each bitstream also includes two independently decodable regions.

The 2D patch of the V-PCC includes a region 1430 for sub-volume 1 and a region 1440 for sub-volume 2, which are rectangular regions for the same components of the same frame and track, and the respective regions 1430 and 1440 may be decoded independently of each other.

Figure 15:
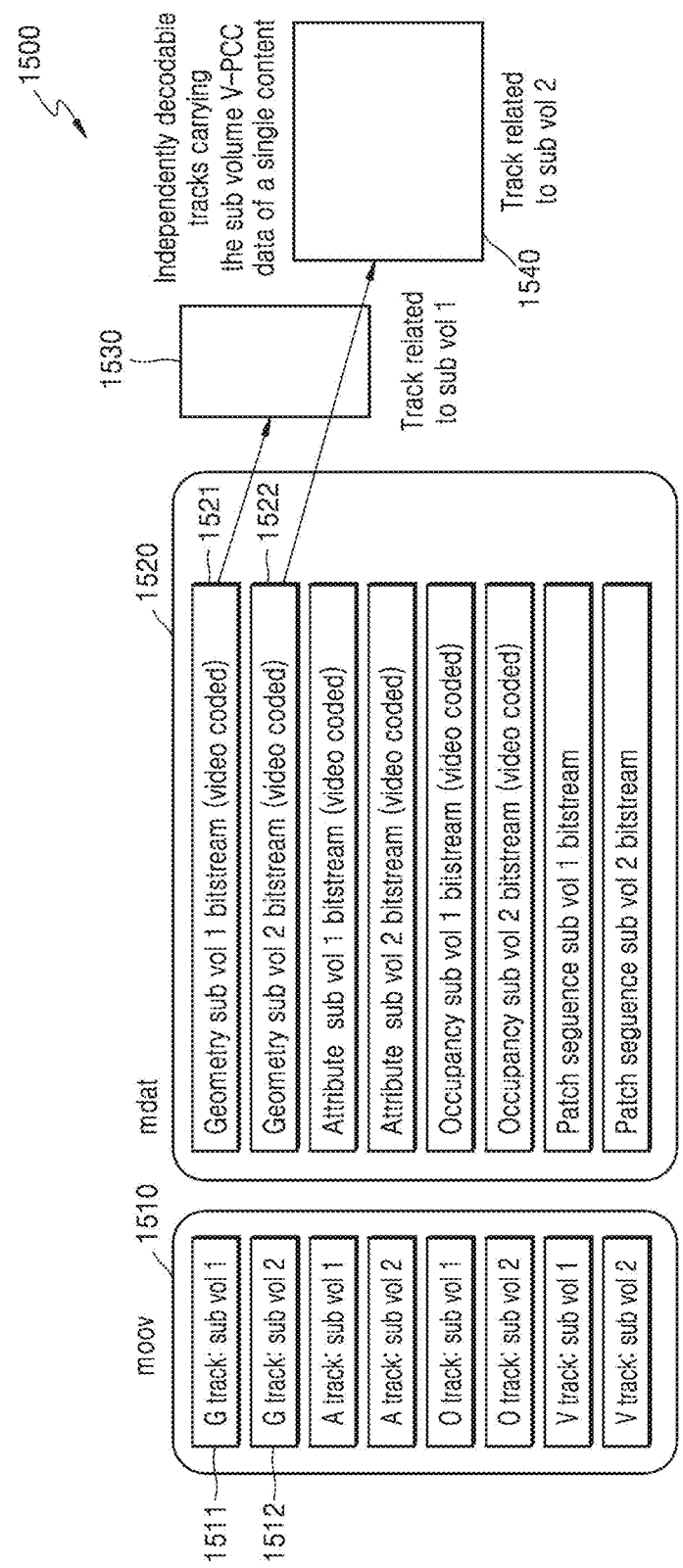
FIG. 15 illustrates a method of encapsulating data for each sub-volume in an ISOBMFF file into separate tracks when point cloud content is divided, according to another embodiment of the present disclosure.

FIG. 15 illustrates a method of encapsulating data for each sub-volume in an ISOBMFF file into separate tracks when point cloud content is divided, according to another embodiment of the present disclosure.

As described above, a single file including single object V-PCC content has at least four tracks. When the data in the file is encoded such that the data is spatially (independently) accessed, decoded, and rendered, the spatially separated encoded data may be encapsulated into a plurality of tracks so as to be delivered in a spatial partial delivered manner. The tracks may exist in a single file or in a plurality of files.

When the tracks exist in the single file, each spatially divided volume may be represented by the corresponding video coded components (geometry, texture, occupancy), and each component may exists as a "partial object component" track. When a single object is divided into two separate sub-volumes, each sub-volume may have three video coded tracks. Therefore, each sub-volume may be represented by a total of six video coded tracks and two patch sequence data tracks for each sub-volume.

Alternatively, patch data corresponding to the relevant patches from each sub-volume may be separated before arithmetic encoding, such that the patch data of each sub-volume may be carried in separate tracks. In this case, data corresponding to each sub-volume may be carried in four separated tracks.

Referring to FIG. 15, a single ISOBMFF file 1500 may include a movie box 1510 and a media data box 1520.

In FIG. 15, since the object is divided into two sub-volumes, the moov box 1510 has G, A, O, and V tracks for each sub-volume. Therefore, the moov box 1510 includes a total of eight tracks, that is, a geometry track 1511 for a first sub-volume, a geometry track 1512 for a second sub-volume, an attribute track for the first sub-volume, an attribute track for the second sub-volume, an occupancy track for the first sub-volume, an occupancy track for the second sub-volume, a V track for the first sub-volume, and a V track for the second sub-volume.

The mdat box 1520 also includes a geometry bitstream, an attribute bitstream, an occupancy bitstream, and a patch sequence bitstream for each sub-volume. Therefore, the mdat box 1520 includes a total of eight bitstreams, that is, a geometry bitstream 1521 for a first sub-volume, a geometry bitstream 1522 for a second sub-volume, an attribute bitstream for the first sub-volume, an attribute bitstream for the second sub-volume, an occupancy bitstream for the first sub-volume, an occupancy bitstream for the second sub-volume, a patch sequence bitstream for the first sub-volume, and a patch sequence bitstream for the second sub-volume.

The 2D patch of the V-PCC includes a region 1530 for sub-volume 1 and a region 1540 for sub-volume 2, which are rectangular regions for the same components of the same frame and track, and the respective regions 1530 and 1540 may be decoded independently of each other and may be encapsulated into separate files.

According to an embodiment of the present disclosure, a media data structure in a media data box for packetization is proposed for a case of being delivered via streaming or delivered in a live manner using MMT.

In addition to spatial partial access for delivery, in the case of streaming or live delivery, media data has to be encapsulated into individual packets for delivery. In this case, since media data that has been stored in a single file in its entirety has to be divided temporally, short temporal "snippets" may be delivered, accessed, decoded, and rendered. For example, it means that after the first 5 seconds of the media is encapsulated and delivered to the client device, the second 5 seconds and then the next 5 seconds, etc are delivered.

For V-PCC encoded data, the temporal manner of rearranging the data for encapsulation may have several approaches due to the different components constituting the encoded data.

Figure 16:
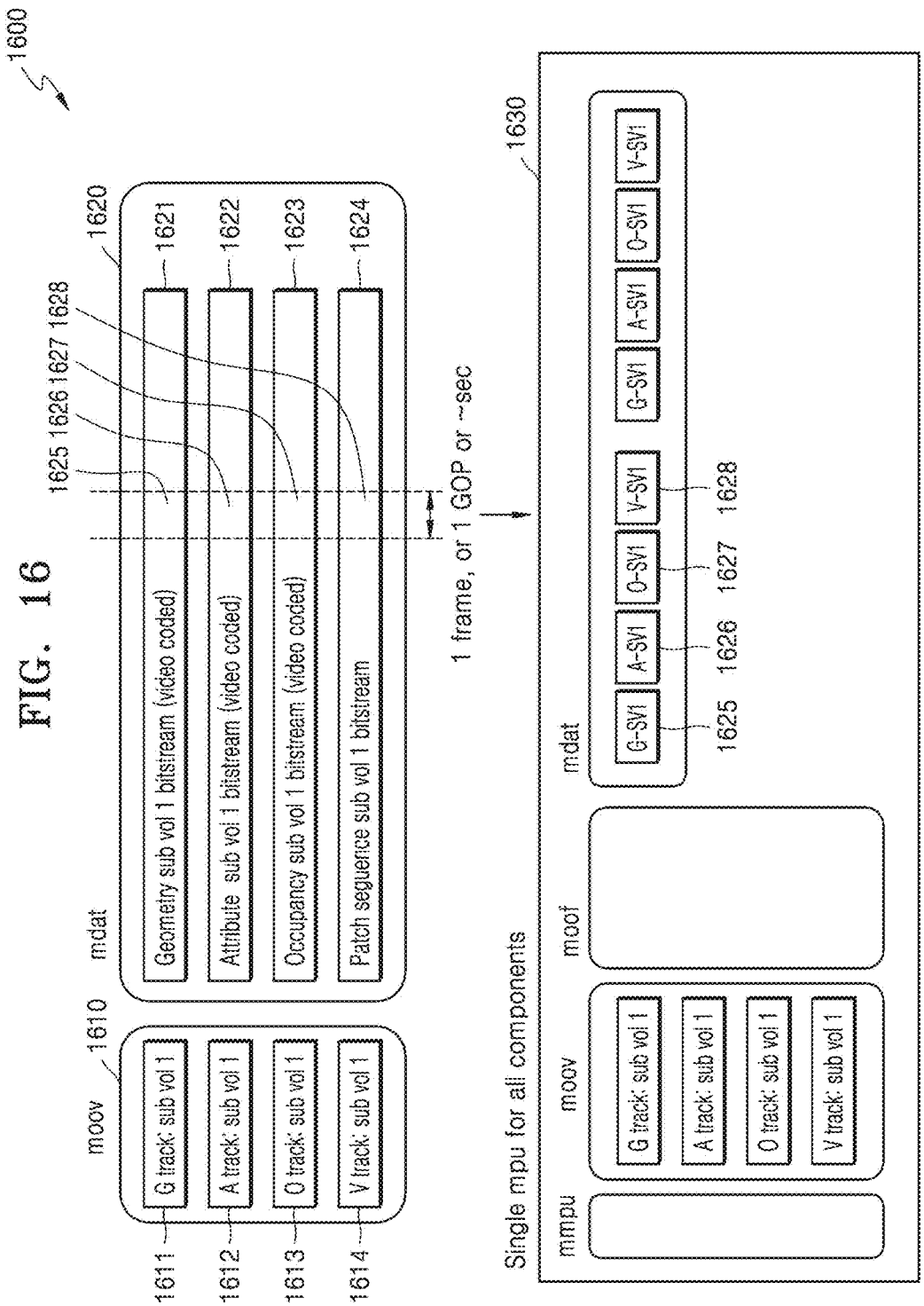
FIG. 16 illustrates components of encapsulated point cloud content, according to an embodiment of the present disclosure.

FIG. 16 illustrates components of encapsulated point cloud content, according to an embodiment of the present disclosure.

FIG. 16 illustrates components of point cloud content encapsulated into a single MMT MPU stream for a certain timeframe. A single MPU of a stream and an mdat box inside the MPU include all V-PCC components. The timeframe for concatenation of components may be based on a single frame, a single GOF (i.e., 32 frames), or a definitive time period (i.e., 6 seconds), depending on the case.

A moov box 1610 for a first sub-volume includes a geometry track 1611, an attribute track 1612, an occupancy track 1613, and a V-PCC track 1614 for the first sub-volume, and an mdat box 1620 includes a geometry bitstream 1621, an attribute bitstream 1622, a occupancy bitstream 1623, and a patch (V-PCC) sequence bitstream 1624, which are concatenated for the first sub-volume.

At this time, each component of the mdat box 1620 may be recombined in a timeframe within the media data box in the single MPU. In the media data box within the single MPU 1630, a portion (G-SV1) 1625 of the geometry bitstream, a portion (A-SV1) 1626 of the attribute bitstream, a portion (O-SV1) 1627 of the occupancy bitstream, and a portion (V-SV1) 1628 of the patch sequence bitstream for the first sub-volume of the specific frame are placed to be continuous. Subsequently, a portion (G-SV1) of the geometry bitstream, a portion (A-SV1) of the attribute bitstream, a portion (O-SV1) of the occupancy bitstream, and a portion (V-SV1) of the patch sequence bitstream for a first sub-volume of a next frame are placed to be continuous.

Figure 17:
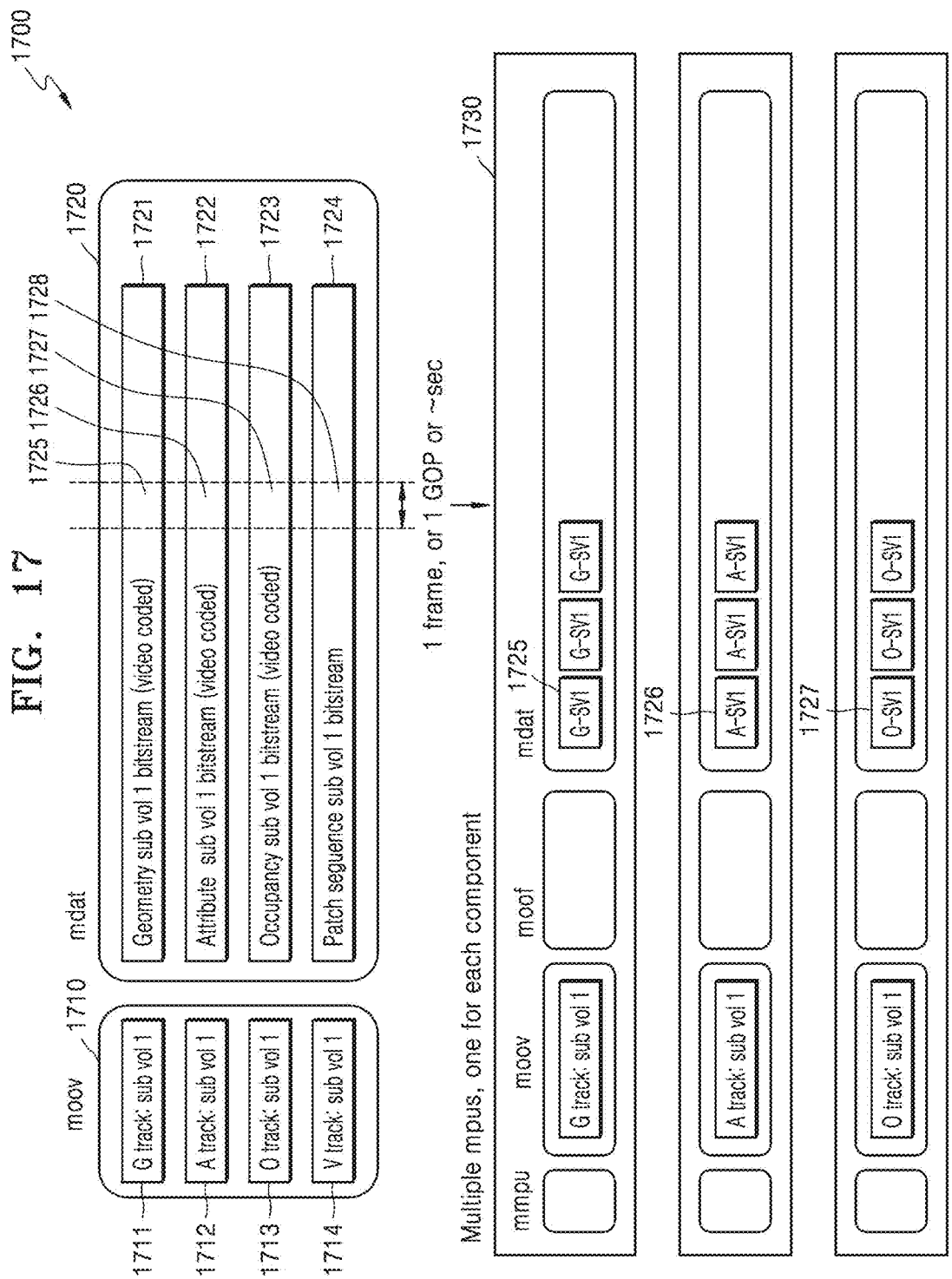
FIG. 17 illustrates components of encapsulated point cloud content, according to another embodiment of the present disclosure.

FIG. 17 illustrates components of encapsulated point cloud content, according to another embodiment of the present disclosure.

FIG. 17 illustrates components of point cloud content encapsulated into a plurality of MMT MPU streams for a certain timeframe. Each MPU of a stream and an mdat box inside the MPU include a single V-PCC component (geometry, attribute, occupancy, and V-PCC). Media data of the carried component may correspond to a whole point cloud content volume or a certain sub-volume of point cloud content. A timeframe for MPU packetization of each component may be based on a single frame, a single GOF (i.e., 32 frames), or a definitive time period (i.e., 6 seconds), depending on the case.

A moov box 1710 for a first sub-volume includes a geometry track 1711, an attribute track 1712, an occupancy track 1713, and a V-PCC track 1714 for the first sub-volume, and an mdat box 1720 includes a geometry bitstream 1721, an attribute bitstream 1722, a occupancy bitstream 1723, and a patch (V-PCC) sequence bitstream 1724, which are concatenated for the first sub-volume.

At this time, each component of the mdat box 1720 may be recombined in a timeframe within the media data box in each MPU.

When the portion (G-SV1) 1725 of the geometry bitstream for the first sub-volume of the certain frame is placed in the media data box inside the first MPU, the portion (G-SV1) of the geometry bitstream for the first sub-volume of the next frame is placed to be continuous.

When the portion (A-SV1) 1726 of the attribute bitstream for the first sub-volume of the certain frame is placed in the media data box inside the second MPU, the portion (A-SV1) of the attribute bitstream for the first sub-volume of the next frame is placed to be continuous.

When the portion (O-SV1) 1727 of the occupancy bitstream for the first sub-volume of the certain frame is placed in the media data box inside the third MPU, the portion (O-SV1) of the occupancy bitstream for the first sub-volume of the next frame is placed to be continuous.

When the portion (not illustrated) of the patch sequence bitstream for the first sub-volume of the certain frame is placed in the media data box inside the fourth MPU, the portion (not illustrated) of the patch sequence bitstream for the first sub-volume of the next frame is placed to be continuous.

Figure 18:
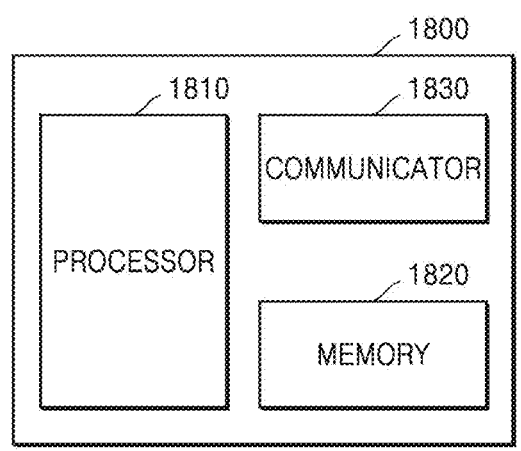
FIG. 18 illustrates a block diagram of an apparatus for transmitting 3D content, according to an embodiment of the present disclosure.

FIG. 18 illustrates a block diagram of an apparatus for transmitting 3D content, according to an embodiment of the present disclosure.

Referring to FIG. 18, the apparatus 1800 for transmitting the 3D content, according to the embodiment of the present disclosure, may include a processor 1810, a communicator 1820, and a memory 1830.

The apparatus 1800 for transmitting the 3D content, according to the embodiment of the present disclosure, may be implemented as part of an encoder, and only components related to the embodiment are illustrated in FIG. 18. Therefore, it will be understood by those of ordinary skill in the art that the apparatus 1800 may further include other general-purpose components as well as the components illustrated in FIG. 18.

The processor 1810 may control a series of processes of transmitting the 3D content described above with reference to FIGS. 1 to 17.

The processor 1810 also controls overall functions of controlling the apparatus 1800 for transmitting the 3D content. For example, the processor 1810 controls overall operations of the apparatus 1800 for transmitting the 3D content by executing programs stored in the memory 1330 inside the apparatus 1800 for transmitting the 3D content. The processor 1810 may be implemented as a central processing unit (CPU), a graphics processing unit (GPU), an application processor (AP), or the like, which is included in the apparatus 1800 for transmitting the 3D content, but is not limited thereto.

The communicator 1820 may connect the apparatus 1800 for transmitting the 3D content to another apparatus or module by using a communication module such as a wired or wireless local area network (LAN) and may transmit and receive data.

The memory 1830 is hardware that stores various data processed in the apparatus 1800 for transmitting the 3D content. For example, the memory 1830 may store data received by the communicator 1820, data processed by the processor, and data to be processed by the processor.

The memory 1830 may include random access memory (RAM), such as dynamic random access memory (DRAM) or static random access memory (SRAM), read-only memory (ROM), electrically erasable programmable read-only memory (EEPROM), compact disc-read-only memory (CD-ROM), Blu-ray or other optical disk storage, hard disk drive (HDD), solid state drive (SSD), or flash memory.

Figure 19:
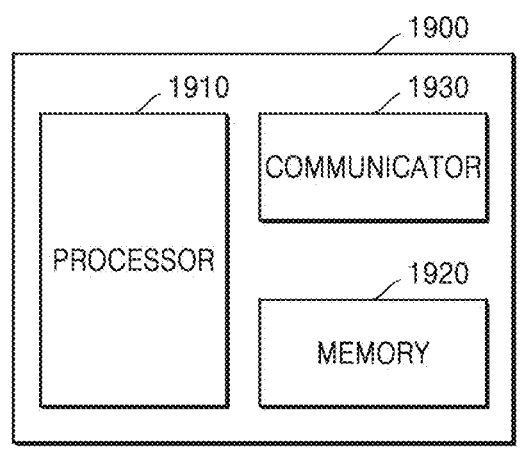
FIG. 19 illustrates a block diagram of an apparatus for receiving 3D content, according to an embodiment of the present disclosure.

FIG. 19 illustrates a block diagram of an apparatus for receiving 3D content, according to an embodiment of the present disclosure.

Referring to FIG. 19, the apparatus 1900 for receiving the 3D content, according to the embodiment of the present disclosure, may include a processor 1910, a communicator 1920, and a memory 1930.

The apparatus 1900 for receiving the 3D content, according to the embodiment of the present disclosure, may be implemented as part of a decoder, and only components related to the embodiment are illustrated in FIG. 19. Therefore, it will be understood by those of ordinary skill in the art that the apparatus 1900 may further include other general-purpose components as well as the components illustrated in FIG. 19.

The processor 1910 may control a series of processes of receiving the 3D content described above with reference to FIGS. 1 to 17.

The processor 1910 also controls overall functions of controlling the apparatus 1900 for receiving the 3D content. For example, the processor 1910 controls overall operations of the apparatus 1900 for receiving the 3D content by executing programs stored in the memory 1930 inside the apparatus 1900 for receiving the 3D content. The processor 1910 may be implemented as a CPU, a GPU, an AP, or the like, which is included in the apparatus 1900 for receiving the 3D content, but is not limited thereto.

The communicator 1920 may connect the apparatus 1900 for receiving the 3D content to another apparatus or module by using a communication module such as a wired or wireless LAN and may transmit and receive data.

The memory 1930 is hardware that stores various data processed in the apparatus 1900 for receiving the 3D content. For example, the memory 1930 may store data received by the communicator 1920, data processed by the processor, and data to be processed by the processor.

The memory 1830 may include RAM, such as DRAM or SRAM, ROM, EEPROM, CD-ROM, Blu-ray or other optical disk storage, HDD, SSD, or flash memory.

Methods according to embodiments described in the claims or specification of the present disclosure may be implemented as hardware, software, or a combination of hardware and software.

When implemented as software, a computer-readable storage medium or a computer program product storing at least one program (software module) may be provided. The at least one program stored in the computer-readable storage medium or the computer program product is configured to be executable by one or more processors in an electronic device. The at least one program includes instructions causing the electronic device to execute the methods according to embodiments described in the claims or specification of the present disclosure.

The at least one program (software module or software) may be stored in a non-volatile memory including RAM and flash memory, ROM, EEPROM, magnetic disc storage device, CD-ROM, digital versatile disc (DVD), other optical storage devices, magnetic cassette, or the like. Alternatively, the at least one program may be stored in a memory constituted by a combination of all or part of them. Also, each of configuration memories may be provided in a multiple number.

The at least one program may be stored in an attachable storage device that is accessible via a communication network including Internet, Intranet, LAN, wide LAN (WLAN), or a storage area network (SAN), or a combination thereof. The storage device may connect to, via an external port, an apparatus for performing the embodiments of the present disclosure. Also, a separate storage device on a communication network may connect to the apparatus for performing the embodiments of the resent disclosure.

In the present disclosure, the term "computer program product" or "computer-readable recording medium" is used to refer generally to a medium such as a memory, a hard disk installed in a hard disk drive, and a signal. The "computer program product" or the "computer-readable recording medium" may be provided to a software computer system including instructions for setting a length of a timer for receiving missing data packets, based on a network metric corresponding to a determined event according to the present disclosure.

A device-readable storage medium may be provided in the form of a non-transitory storage medium. The "non-transitory storage medium" refers to a tangible device and means that it does not include a signal (for example, electromagnetic wave). This term does not distinguish between a case in which data is stored semi-permanently in a storage medium and a case in which data is stored temporarily in a storage medium. For example, the "non-transitory storage medium" may include a buffer that temporarily stores data.

According to an embodiment, methods according to various embodiments described in the present disclosure may be provided in a state of being included in a computer program product. The computer program product may be traded between a seller and a buyer as a product. The computer program product may be distributed in the form of a device-readable storage medium (for example, CD-ROM) or may be distributed through an application store (for example, Play Store™) or two user devices (for example, smartphones) directly or online (for example, downloaded or uploaded). In case of online distribution, at least part of the computer program product (for example, downloadable app) may be at least temporarily stored in a device-readable storage medium, such as a memory of a manufacturer's server, an application store's server, or a relay server or may be temporarily generated.

In the specific embodiments of the present disclosure, the components included in the present disclosure have been expressed in a singular or plural form according to the suggested specific embodiments of the present disclosure. However, the expression in the singular or plural form are appropriately selected according to the suggested situations for convenience of explanation, and are not intended to limit the present disclosure to the single or plural components. Even though a certain component is expressed in a plural form, it may be provided with a single component, and even though a certain component is expressed in a singular form, it may be provided with a plurality of components.

Although specific embodiments of the present disclosure have been described in the detailed description of the present disclosure, various modifications may be made thereto without departing from the scope of the present disclosure. Therefore, the scope of the present disclosure should not be limited to the described embodiments of the present disclosure, but should be determined not only by the appended claims but also by the equivalents of the claims.

The invention claimed is:

1. A method of transmitting three-dimensional (3D) video content, the method comprising:
   defining reference coordinate of a six degrees of freedom (6DoF) space represented by a volumetric cuboid;
   defining placement information where a bounding box representing a 6DoF object is placed in the 6DoF space, the placement information comprising reference coordinate, scaling information, and rotation information of the bounding box;
   placing the bounding box in the 6DoF space by matching the reference coordinate of the bounding box and the reference coordinate of the 6DoF space;
   dividing the placed bounding box into at least two sub-blocks based on division information;
   compressing 3D video content, comprising the at least two sub-blocks of the bounding box, into a two-dimensional (2D) video frame;
   obtaining, from the 2D video frame, location information about compressed data corresponding to the at least two sub-blocks of the bounding box;
   encoding the 2D video frame;
   encapsulating the compressed data into tracks for each component of the bounding box to generate a media file comprising the encoded 2D video frame and the location information; and
   transmitting the media file,
   wherein each of the tracks is divided into at least two regions corresponding to the sub-blocks of the bounding box, where the at least two regions are independently decodable of each other, and
   wherein the placement information further comprises the scaling information of the bounding box, and rotation information of the bounding box and the rotation information is defined based on an orientation of the bounding box referring to the 6DoF space.

2. The method of claim 1, wherein the generating of the media file comprises:
   inserting, into a media data box inside the media file, bitstreams of a plurality of components corresponding to the at least two sub-blocks of the bounding box in the encoded 2D video frame and a bitstream comprising patch information about the bounding box; and
   inserting, into a metadata box inside the media file, tracks for metadata corresponding to each of the plurality of components and a track for metadata corresponding to the patch information.

3. The method of claim 2,
   wherein the dividing comprises dividing a single bounding box into a first sub-object and a second sub-object, and
   wherein the generating of the media file comprises:
      generating bitstreams for each component of the first sub-object and bitstreams for each component of the second sub-object into a single bitstream for each component; and
      generating tracks for each component of the first sub-object and tracks for each component of the second sub-object into a single track for each component.

4. The method of claim 2,
   wherein the dividing comprises dividing a single bounding box object into a first sub-object and a second sub-object, and
   wherein the generating of the media file comprises:
      generating bitstreams for each component of the first sub-object and bitstreams for each component of the second sub-object into separate bitstreams for each component; and
      generating tracks for each component of the first sub-object and tracks for each component of the second sub-object into separate tracks for each component.

5. The method of claim 2, wherein the media file is a file based on an International Organization for Standardization (ISO)-based media file format (ISOBMFF), the media data box is an mdat box, and the metadata box is a movie (moov) box.

6. The method of claim 2,
wherein the 3D video content comprises a point cloud, and the 2D video frame comprises a geometry image representing location information about points included in the point cloud, a texture image representing color information about the points, and an occupancy map image representing information about pixels having information about the point cloud among pixels of a 2D image included in the 2D video frame, and
wherein the metadata corresponding to the patch information comprises auxiliary data comprising information about patches obtained from the point cloud.

7. A method of receiving three-dimensional (3D) video content, the method comprising:
processing a received packet to restore a media file;
parsing the media file comprising tracks for each component of a bounding box representing a six degrees of freedom (6DoF) object to extract an encoded two-dimensional (2D) video frame and metadata;
decoding the encoded 2D video frame; and
reconstructing and outputting the 3D video content based on the 2D video frame and the metadata,
wherein the parsing of the media file comprises obtaining information about a 6DoF space represented by a volumetric cuboid, placement information where the bounding box is placed in the 6DoF space, division information about at least two sub-blocks of the bounding box, and location information about data corresponding to the at least two sub-blocks of the bounding box in the 2D video frame,
wherein the bounding box is placed in the 6DoF space by matching reference coordinate of the bounding box and reference coordinate of the 6DoF space according to the placement information,
wherein each of the tracks is divided into at least two regions corresponding to the at least two sub-blocks of the bounding box, where the at least two regions are independently decodable of each other, and
wherein the placement information comprises the reference coordinate of the bounding box, scaling information of the bounding box, and rotation information of the bounding box and the rotation information is defined based on an orientation of the bounding box referring to the 6DoF space.

8. An apparatus for transmitting three-dimensional (3D) video content, the apparatus comprising:
a processor configured to:
generate a two-dimensional (2D) video frame obtained by compressing the 3D video content, and metadata required to reconstruct the 2D video frame into 3D content,
encode the 2D video frame, and
encapsulate compressed data into tracks for each component of a bounding box representing a six degrees of freedom (6DoF) object corresponding to the 3D video content to generate a media file comprising the encoded 2D video frame and the metadata; and
a communicator configured to transmit the media file,
wherein the metadata comprises information about a 6DoF space represented by a volumetric cuboid, placement information where the bounding box is placed in the 6DoF space, and division information about at least two sub-blocks of the bounding box,
wherein the bounding box is placed in the 6DoF space by matching reference coordinate of the bounding box and reference coordinate of the 6DoF space according to the placement information,
wherein each of the tracks is divided into at least two regions corresponding to the sub-blocks of the bounding box, where the at least two regions are independently decodable of each other, and
wherein the placement information comprises the reference coordinate of the bounding box, scaling information of the bounding box, and rotation information of the bounding box and the rotation information is defined based on an orientation of the bounding box referring to the 6DoF space.

9. The apparatus of claim 8, wherein the media file is generated by inserting, into a media data box inside the media file, bitstreams of a plurality of components corresponding to the at least two sub-blocks of the bounding box in the encoded 2D video frame and a bitstream including patch information about the bounding box and inserting, into a metadata box inside the media file, tracks for metadata corresponding to each of the plurality of components and a track for metadata corresponding to the patch information.

10. The apparatus of claim 9,
wherein the processor is further configured to divide a single bounding box into a first sub-object and a second sub-object, and
wherein the media file comprises bitstreams for each component of the first sub-object, bitstreams for each component of the second sub-object, which are generated into a single bitstream for each component, and tracks for each component of the first sub-object and tracks for each component of the second sub-object, which are generated into a single track for each component.

11. The apparatus of claim 9,
wherein the processor is further configured to divide a single bounding box into a first sub-object and a second sub-object, and
wherein the media file comprises bitstreams for each component of the first sub-object, bitstreams for each component of the second sub-object, which are generated into separate bitstreams for each component, and tracks for each component of the first sub-object and tracks for each component of the second sub-object, which are generated into separate tracks for each component.

12. The apparatus of claim 9, wherein the media file is a file based on an International Organization for Standardization (ISO)-based media file format (ISOBMFF), the media data box is an mdat box, and the metadata box is a movie (moov) box.

13. The apparatus of claim 9,
wherein the 3D video content comprises a point cloud, and the 2D video frame comprises a geometry image representing location information about points included in the point cloud, a texture image representing color information about the points, and an occupancy map image representing information about pixels having information about the point cloud among pixels of a 2D image included in the 2D video frame, and
wherein the metadata corresponding to the patch information comprises auxiliary data comprising information about patches obtained from the point cloud.

14. A non-transitory computer-readable recording medium having recorded thereon a computer program for executing the method of claim 1.

15. A non-transitory computer-readable recording medium having recorded thereon a computer program for executing the method of claim 7.

* * * * *